United States Patent
Kojo et al.

(10) Patent No.: US 8,098,977 B2
(45) Date of Patent: Jan. 17, 2012

(54) SIGNAL REPRODUCING APPARATUS AND SIGNAL REPRODUCING METHOD

(75) Inventors: Tomomasa Kojo, Tokyo (JP); Tetsuya Aoki, Tokyo (JP); Kenji Shiba, Tokyo (JP)

(73) Assignee: Sony Corporation, Tokyo (JP)

( * ) Notice: Subject to any disclaimer, the term of this patent is extended or adjusted under 35 U.S.C. 154(b) by 2768 days.

(21) Appl. No.: 10/362,142

(22) PCT Filed: Jun. 19, 2002

(86) PCT No.: PCT/JP02/06114
§ 371 (c)(1),
(2), (4) Date: Jun. 6, 2003

(87) PCT Pub. No.: WO02/103698
PCT Pub. Date: Dec. 27, 2002

(65) Prior Publication Data
US 2004/0033057 A1 Feb. 19, 2004

(30) Foreign Application Priority Data

Jun. 19, 2001 (JP) .................. 2001-185252
Jun. 12, 2002 (JP) .................. 2002-171797

(51) Int. Cl.
*H04N 9/80* (2006.01)
(52) U.S. Cl. ................... 386/248; 386/357; 375/240.25; 375/240.26
(58) Field of Classification Search .................. 704/212; 386/96, 111; 370/392
See application file for complete search history.

(56) References Cited

U.S. PATENT DOCUMENTS

| 6,618,549 B1 * | 9/2003 | Kato et al. ..................... 386/248 |
| 6,741,795 B1 * | 5/2004 | Takehiko et al. .............. 386/220 |
| 6,788,653 B1 * | 9/2004 | Sakamoto et al. ............ 370/282 |
| 6,850,696 B1 * | 2/2005 | Van Gestel ..................... 386/241 |
| 6,904,403 B1 * | 6/2005 | Muraki et al. ................. 704/212 |
| 6,947,422 B1 * | 9/2005 | Ichimura et al. .............. 370/392 |

FOREIGN PATENT DOCUMENTS

| EP | 1085724 A2 | 3/2001 |
| JP | 2001-94448 A | 4/2001 |
| JP | 2001-144785 A | 5/2001 |
| JP | 2001-160266 A | 6/2001 |
| JP | 2001-250318 A | 9/2001 |

* cited by examiner

*Primary Examiner* — Christopher S Kelley
*Assistant Examiner* — Christopher Findley
(74) *Attorney, Agent, or Firm* — Wolf, Greenfield & Sacks, P.C.

(57) ABSTRACT

A signal reproduction device and signal reproduction method capable of automatically discriminating the format of input data and reproducing the data is provided. The signal reproduction device comprises an IEEE 1394 link chip 12, which receives transmission signals obtained by converting data in a plurality of prescribed signal formats into a prescribed packet format and transmitting, and reproduces signals in a prescribed signal format from the received transmission signals in packet form, as well as an IEEE 1394 microcontroller 13, which extracts a prescribed packet of received transmission signals, detects data in the extracted packet indicating modification from the signal format currently being received to another prescribed signal format, and based on the detected signal format modification data, outputs parameters necessary for reproduction of signals in another prescribed signal format from received signals in packet form; and the signal reproduction device automatically discriminates the data format of input data and reproduces the data.

8 Claims, 20 Drawing Sheets

SIGNAL REPRODUCING APPARATUS AND SIGNAL REPRODUCING METHOD

CROSS REFERENCE TO RELATED APPLICATIONS

This application is a national stage filing under 35 U.S.C. § 371 of international application PCT/JP02/06114, filed Jun. 19, 2002, which claims the benefit of Japanese Application Nos. JP2001-185252, filed Jun. 19, 2001, and JP2002-171797, filed Jun. 12, 2002, the disclosures of all of which are incorporated by reference herein in their entirety.

TECHNICAL FIELD

This invention relates to a signal reproduction device and signal reproduction method for signal format recognition in, for example, a multi disc player and audio-video (AV) amplifier.

BACKGROUND ART

Conventionally, in interfaces conforming to the IEEE 1394 standard, for example between signal recording and reproduction devices, music data is transmitted and received, and music data which had been recorded in one signal recording and reproduction device is reproduced in another signal recording and reproduction device.

DISCLOSURE OF THE INVENTION

However, there is the problem that, because there is no means for recognizing the data format for AM824E standard data used by the above-described conventional signal recording and reproduction device to send and receive music data through an interface conforming to the IEEE 1394 standard, if the contents of the data are not examined, the data format cannot be determined.

However, actual examination of data contents requires time, so that there is the problem that audio interruptions and absence of track beginnings occur.

As a method other than that described above, it is possible for equipment which sends and receives music data to perform negotiation in order to conduct communications, and to set a communication protocol for transmission and reception; however, the method for setting a communication protocol for this purpose is not stipulated in the standards, and so when setting the communication protocol, there is the problem that the format must be recognized based on the data contents.

This invention was devised in light of the above problems, and has as an object the provision of a signal reproduction device and signal reproduction method enabling the automatic discrimination of the data format of, and reproduction of, input data.

A signal reproduction device of this invention comprises reception means to receive transmitted transmission signals resulting from the conversion of data in a plurality of prescribed signal formats into a prescribed packet type; reproduction means to reproduce signals in a prescribed signal format from transmission signals received by the reception means and converted into packets; packet extraction means to extract a prescribed packet of transmission signals received by the reception means; modification data detection means to detect, in an extracted packet, data indicating that modification has been performed from the currently received prescribed signal format to another prescribed signal format; and, control means to send, to the reproduction means, parameters necessary for reproduction by the reproduction means, from signals received and converted into packets to signals in another prescribed signal format, based on detected signal format modification data.

Further, a signal reproduction method of this invention comprises a reception step, in which transmission signals, obtained by converting data in a plurality of prescribed signal formats into a prescribed packet format and transmitting, are received; a reproduction step, in which signals in a prescribed signal format are reproduced from transmission signals converted into packet form, received in the reception step; a packet extraction step, in which a prescribed packet of transmission signals received in the reception step is extracted; a modification data detection step, in which data is detected, in an extracted packet, indicating that modification has been performed from the currently received prescribed signal format to another prescribed signal format; and, a control step, in which, based on the detected signal format modification data, parameters necessary for reproduction of signals in another prescribed signal format from received signals converted into packets in the reproduction step are sent to the reproduction step.

Hence the action according to this invention is as follows.

The reception means acts to receive transmission signals, which are data in a plurality of prescribed signal formats converted into a prescribed packet format and transmitted. The reproduction means acts to reproduce signals in a prescribed signal format from transmission signals, converted into packets, which have been received by the reception means. The packet extraction means acts to extract a prescribed packet of the transmission signals received by the reception means. The modification data detection means acts to detect data, from an extracted packet, indicating that modification has been performed from a prescribed signal format of the currently received signals to another prescribed signal format. The control means acts, based on the detected signal format modification data, to send to the reproduction means parameters necessary to reproduce signals in other prescribed signal formats from signals converted into packets and received by the reception means.

BEST MODE FOR CARRYING OUT THE INVENTION

Below, an aspect of this invention is explained.

A signal reproduction device of this aspect examines received data packets and automatically recognizes data formats, and can be applied to, for example, data in an IEC 60958-conformant format among formats conforming to Audio and Music Data Transmission Protocol 1.0 and AMDTR 2.0, as well as data in DSD (Digital Stream Direct) format, and data in DVD (Digital Versatile Disc) Audio format.

Figure 1:
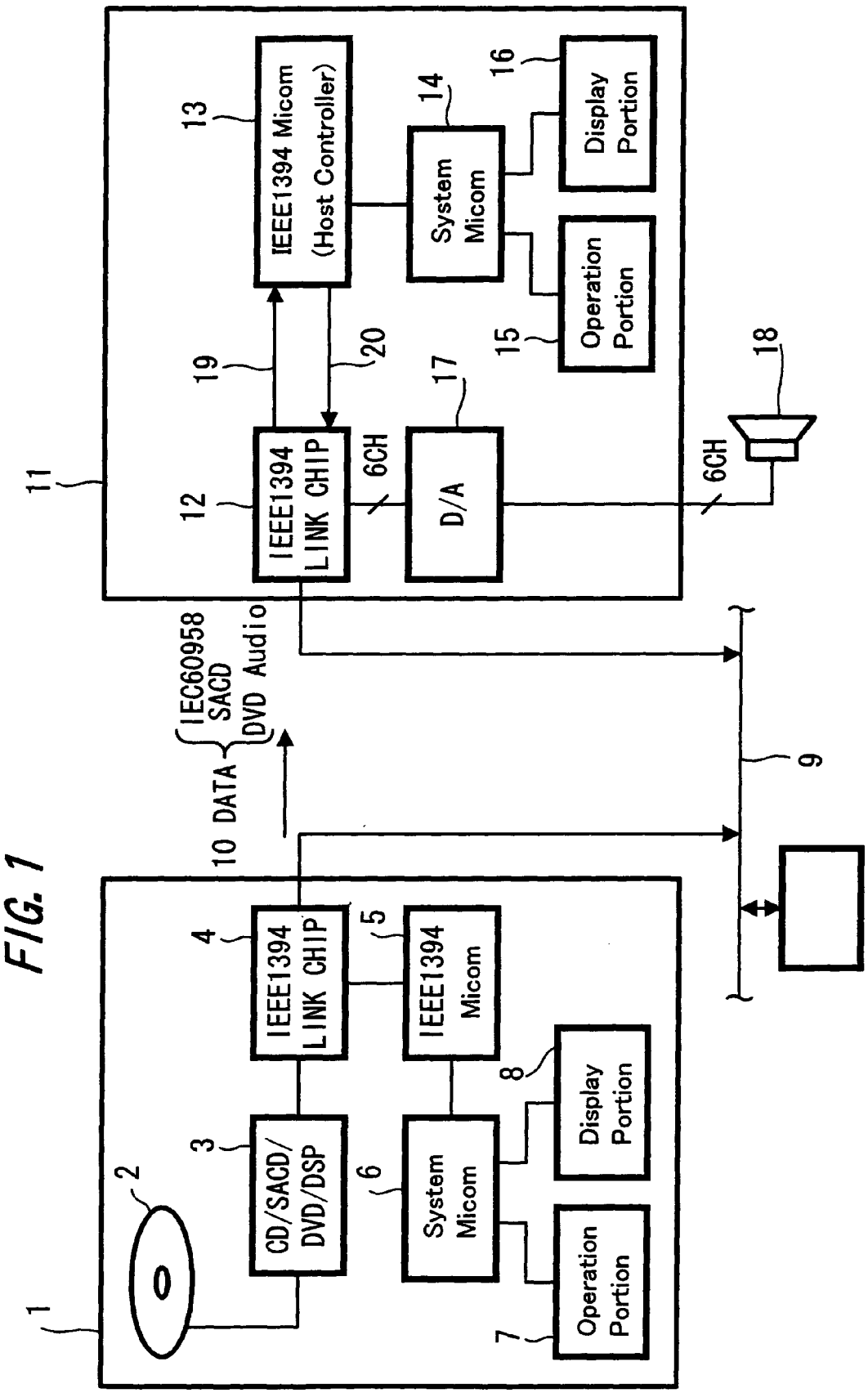
FIG. 1 is a block diagram showing the configuration of a communication system to which this aspect is applied.

FIG. 1 is a block diagram showing the configuration of a communication system to which this aspect is applied.

In FIG. 1, a multiformat-compatible transmitter 1 and multiformat-compatible receiver 11 are connected via, for example, a network 9 conforming to the IEEE 1394 standard, and, for example, data in an IEC 60958-conformant format, SACD (Super Audio Compact Disc) format data as DSD format data, CD (Compact Disc) format data, DVD Audio format data, or similar data 10 is transmitted from the multiformat-compatible transmitter 1 to the multiformat-compatible receiver 11.

The multiformat-compatible transmitter 1 is configured to have a disc 2 as recording media on which is recorded the data 10; a CD/SACD/DVD DSP (Digital Signal Processor) 3 which performs reproduction signal processing of data in various formats, recorded on the disc 2; an IEEE 1394 link chip 4, which makes settings for transmission of the data 10 over a network conforming to the IEEE 1394 standard; an IEEE 1394 microcontroller 5, which controls the IEEE 1394 link chip 4; a system microcontroller 6, which controls the multiformat-compatible transmitter 1; an operation portion 7 capable of various input in order to operate the multiformat-compatible transmitter 1; and a display portion 8 which displays the status of operation of the multiformat-compatible transmitter 1.

The multiformat-compatible receiver 11 is configured to have an IEEE 1394 link chip 12, which makes settings for reception of the data 10 over a network conforming to the IEEE 1394 standard; an IEEE 1394 microcontroller 13, which controls the IEEE 1394 link chip 12; a system microcontroller 14, which controls the multiformat-compatible receiver 11; an operation portion 15 capable of various input in order to operate the multiformat-compatible receiver 11; a display portion 16 which displays the status of operation of the multiformat-compatible receiver 11; a D/A converter 17 which converts 6-channel digital data received by the IEEE 1394 link chip 12 into analog signals; and a speaker 18 which reproduces and acoustically outputs the converted analog signals.

The IEEE 1394 microcontroller 13 is a host controller, and has a function for performing reception format settings 20 of the IEEE 1394 link chip 12 by performing CFR (configuration register) reading from the IEEE 1394 link chip 12.

Figure 2:
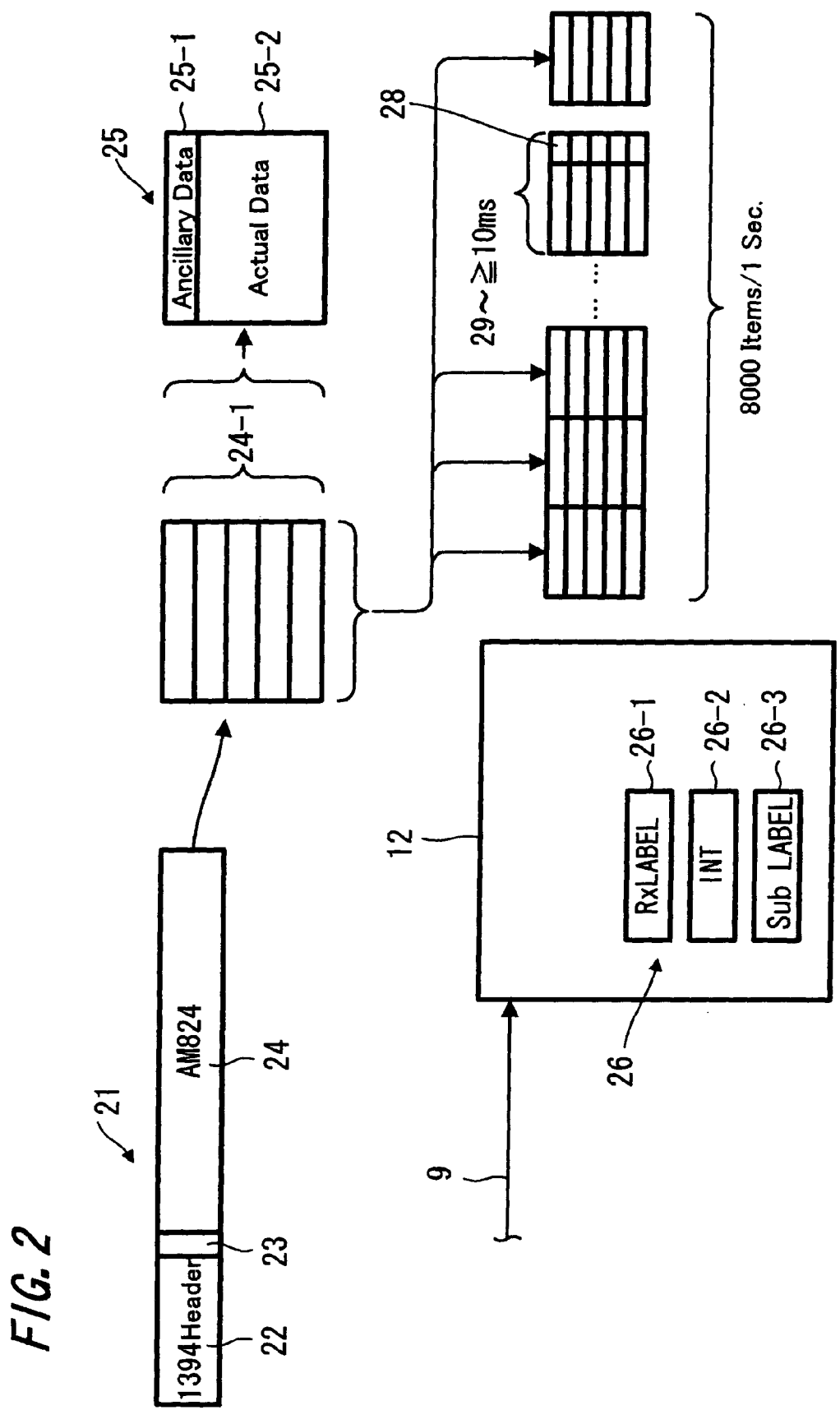
FIG. 2 is a drawing showing detection of a data stream change by a register.

FIG. 2 is a drawing showing detection of a data stream change by a register within the above-described IEEE 1394 link chip 12.

In FIG. 2, the data 10 on the IEEE 1394-standard network 9 shown in FIG. 1 is configured of IEEE 1394 packets 21. An IEEE 1394 packet 21 is configured to have an 1394 header 22, a CRC (cyclic redundancy check) and CIP (common isochronous protocol) header 23, and AM824 data 24. The AM824 data 24 is data in an above-described CD/SACD/DVD audio format.

The data 10 on the IEEE 1394-standard network 9 is received and processed in the IEEE 1394 link chip 12, and in the above-described CFR register 26, is allocated to RxLA-BEL 26-1, which makes reception settings; INT 26-2, which performs interrupt processing for the system microcontroller 14 depending on the combination of received signals; and SubLABEL 26-3.

The AM824 data 24 of the above-described IEEE 1394 packet 21 is data 24-1 having data regions for various formats; this data 24-1 is configured to have, for example, data 25 having beginning-portion ancillary data 25-1 and actual data 25-2. Here, ancillary data 25-1 is additional data for the actual data 25-2, and indicates data such as the number of channels and the speaker placement.

In this IEEE 1394 link chip 12, AM824 data 24 in an IEEE 1394 packet 21 is such that the data format cannot be determined if the data contents are not observed. Hence in the IEEE 1394 link chip 12, reception signal data is allocated to the register 26, and by having the register 26 set flags according to the data format of the reception signals, the system microcontroller 14 can detect flags and automatically discriminate the format of the data 24.

For example, 8000 items of the AM824 data 24 of an IEEE 1394 packet 21 are input in one second, and by detecting values indicated by INT 26-2 performing the allocation processing of the system microcontroller 14 by combining signals received in the register 26, as well as detecting ancillary no-data for detection of stream changes, the system microcontroller 14 detects stream changes occurring over an interval of 10 msec or longer. Here the ancillary no-data 28 indicates that the data of this one sample is invalid, and that the data is not audio processed and output. In this aspect, when such data is detected, stream change detection can be performed.

When the system microcontroller 14 detects a stream change, on recognizing that there has been a change in the signal data format, the data is supplied to a later-stage audio processing circuit.

Figure 3:
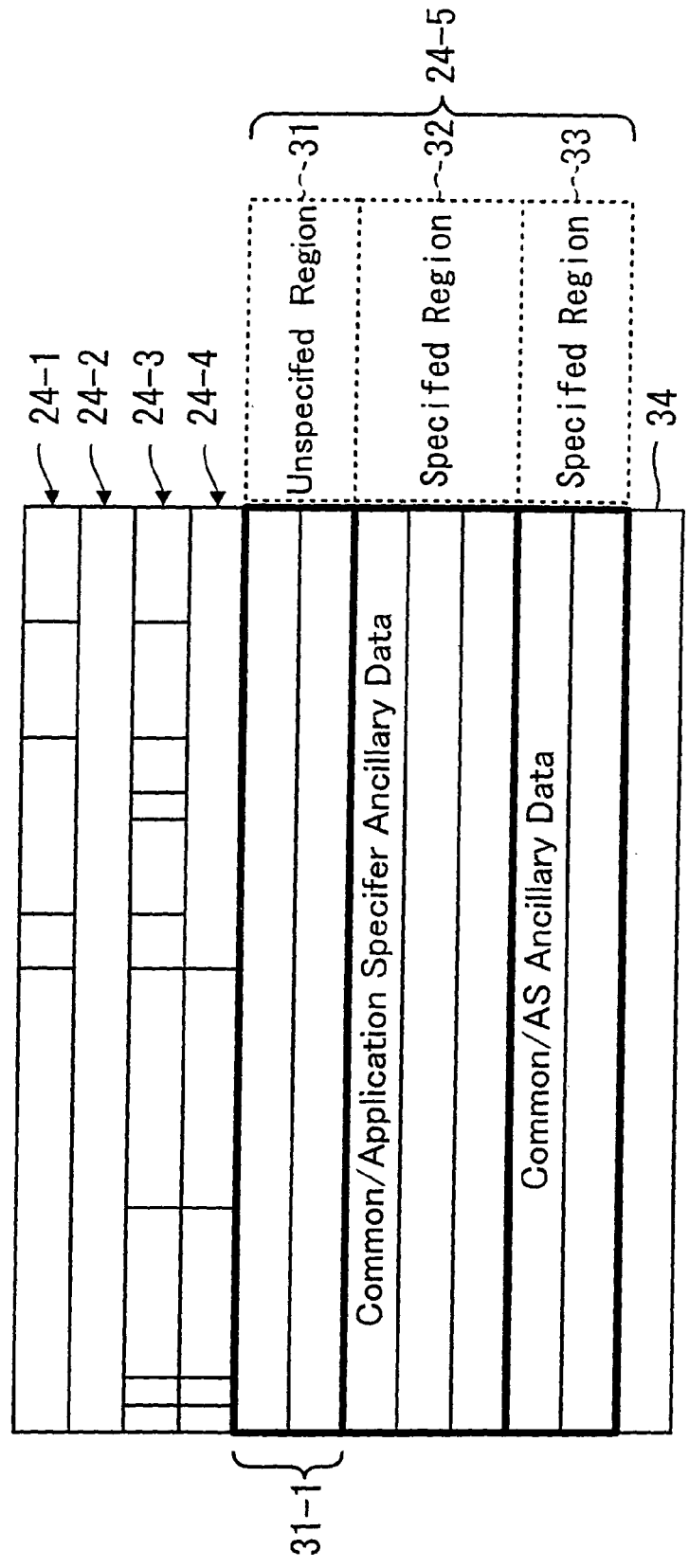
FIG. 3 is a drawing showing the IEEE 1394 packet structure.

FIG. 3 is a drawing showing the IEEE 1394 packet structure.

FIG. 3 shows the data structure when transmitting the above-described AM824 data 24 shown in FIG. 2 over an IEEE 1394-standard network 9. The header regions 24-1 to 24-4 are similar to 22 and 23 in FIG. 2.

The data 24-5 are configured to have an unspecified region 31, comprising a detection data region 31-1 in the leading portion, a specified region 32, and a specified region 33. The specified region 32 is configured to have common/application specifier ancillary data, having a common data region in a variety of formats. The specified region 33 is configured to have common/AS ancillary data, having a common data region in a variety of formats. While standards permit the intermixing and sending of data in various formats in the specified regions 32 and 33, for practical reasons data is sent separately for each of the different formats. Also, a data CRC 34 is provided at the end.

Figure 4:
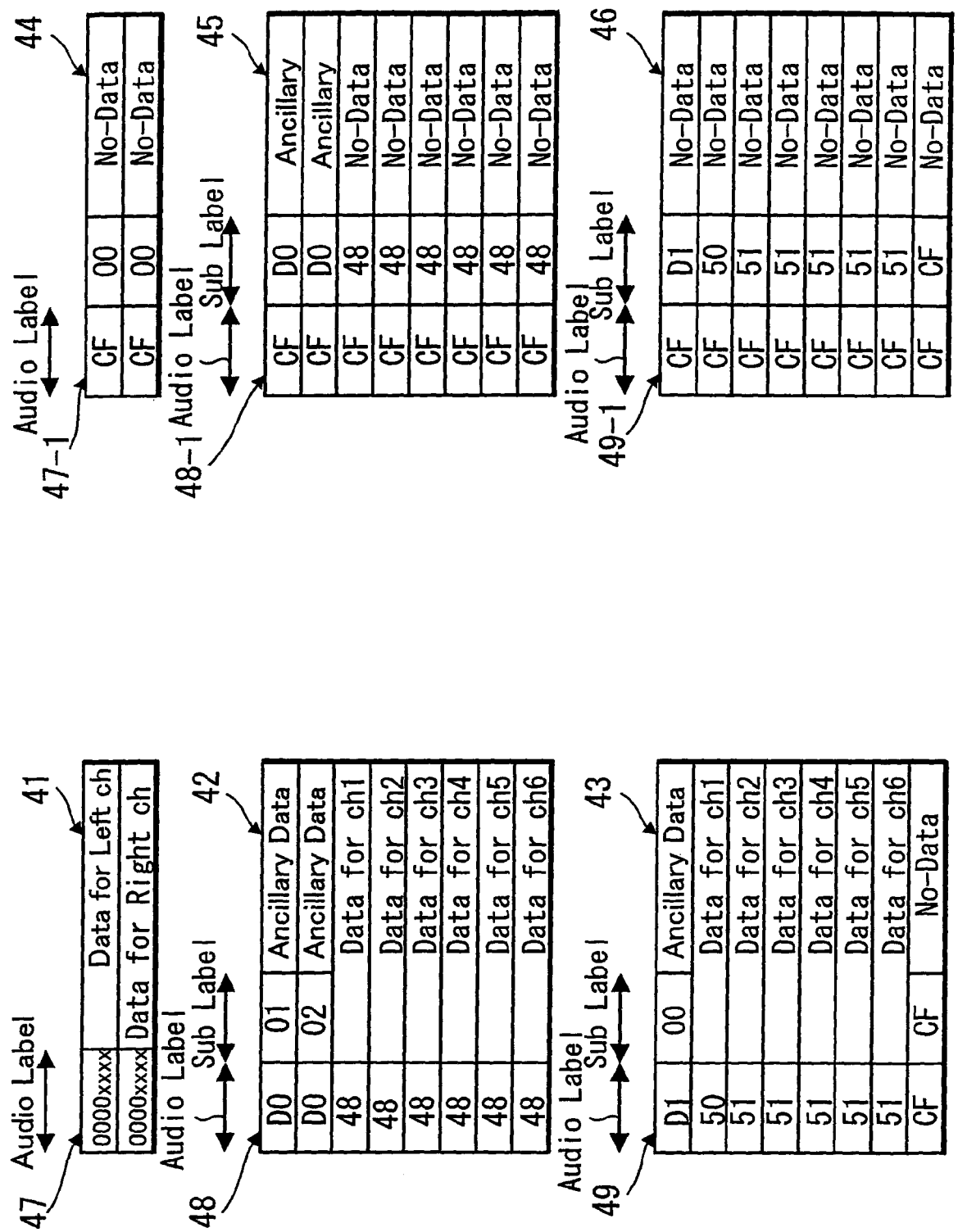
FIG. 4 is a drawing showing the data of an IEEE 1394 packet.

FIG. 4 is a drawing showing the data of an IEEE 1394 packet.

FIG. 4 shows the structure of the data 24-1 shown in FIG. 3 above.

In FIG. 4, 31 shows the structure of data for CDs, MDs (minidiscs) and similar in an IEC 60958-conformant format. 44 shows the structure of data of CDs, MDs (minidiscs) and similar for ancillary no-data for an IEC 60958-conformat format. This data 41 in an IEC 60958-conformant format (CD, MD) and data 44 in an ancillary no-data for an IEC 60958-conformant format (CD, MD) are discriminated according to whether the upper 4 bits of the register value indicated by 47 is "0000" (binary) while the lower 4 bits is, as an arbitrary value from "0000" to "1111", "xxxx" (binary), and whether the upper 8 bits of the register value indicated by 47-1 is "CF" (hexadecimal) while the lower 8 bits is "00" (hexadecimal).

Further, 42 shows the structure of multi-bit linear audio format DVD audio and other data; 45 shows the structure of DVD audio and other data in the ancillary no-data for multi-bit linear audio format. The multi-bit linear audio format (DVD audio) data 42 is discriminated by either "D0" (hexadecimal) in the upper 8 bits of the value of the register indicated by 48 and "01" (second quadlet "02") (hexadecimal) in the lower 8 bits, or by "CF" (hexadecimal) in the upper 8 bits of the value of the register indicated by 48-1, and "D0" (hexadecimal) in the lower 8 bits.

Further, 43 indicates the structure of SACD and other data in a one-bit audio data format; 46 indicates the structure of SACD and other data in an ancillary no-data for one-bit audio data format. The one-bit audio data format (SACD) data 43 and the ancillary no-data for one-bit audio data format (SACD) data 46 are discriminated by either "D1" (second quadlet "50") (hexadecimal) in the upper 8 bits of the value of the register indicated by 49 and "00" (hexadecimal) in the lower 8 bits, or by "CF" (hexadecimal) in the upper 8 bits of the value of the register indicated by 49-1, and "D1" (second quadlet "50") (hexadecimal) in the lower 8 bits.

Figure 5:
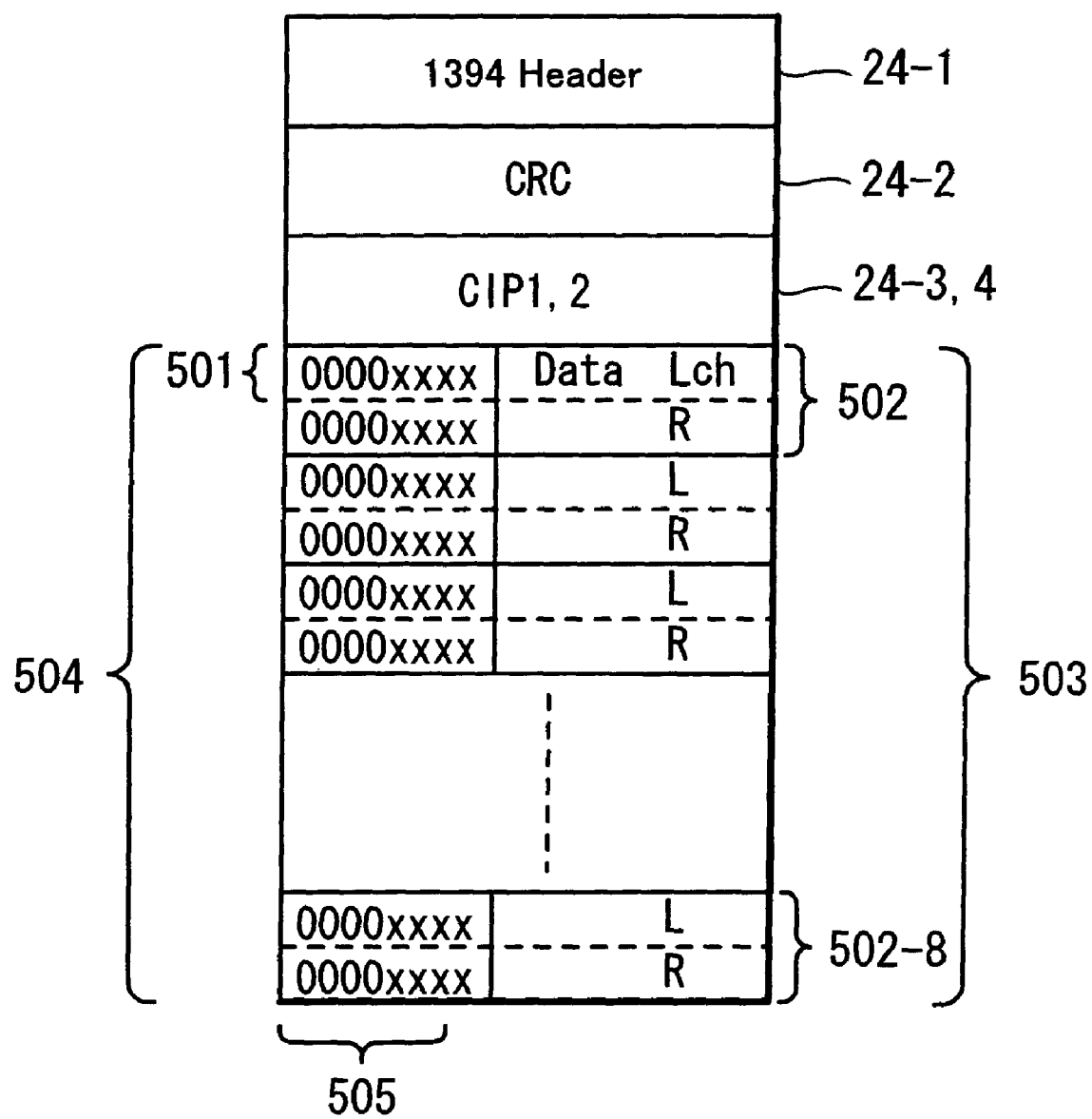
FIG. 5 is a drawing showing an IEC 60958 (CD, MD) packet.

FIG. 5 is a drawing showing an IEC 60958 (CD, MD) packet.

In FIG. 5, the 1394 header 24-1, CRC 24-2, and CIP 1, 2 (24-3, 4) are similar to those shown in FIG. 3. The first quadlet 501 comprises the binary "0000xxxx" indicated in 505 and a data L (left) channel; the following second quadlet comprises the binary "0000xxxx" indicated in 505 and a data R (right) channel; and these two quadlets constitute one sample 502. Samples similar to this one sample 502 are provided in the 8 samples up to sample 502-8 in 503, for a total of 16 quadlets 504.

Figure 6:
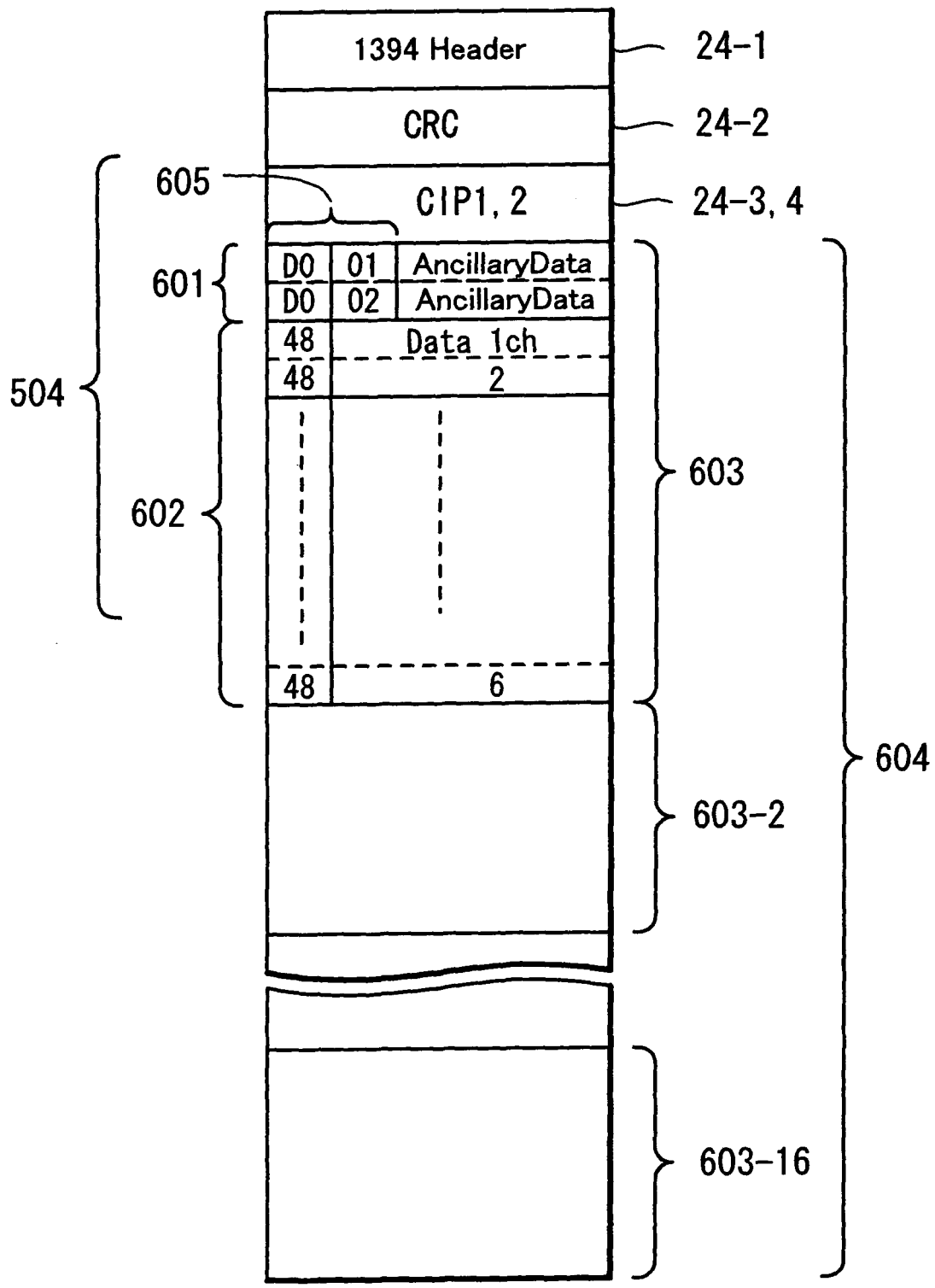
FIG. 6 shows a DVD packet.

FIG. 6 shows a DVD packet.

In FIG. 6, the 1394 header 24-1, CRC 24-2, and CIP 1, 2 (24-3, 4) are similar to those shown in FIG. 3. As indicated by 601, one quadlet consists of the hexadecimal "D001" indicated by 605 and ancillary data; the following second quadlet consists of the hexadecimal "D002" indicated by 605 and ancillary data. As indicated by 602, the third quadlet consists of the hexadecimal "48" indicated by 605 and data channel 1, and the following fourth quadlet consists of the hexadecimal "48" indicated by 605 and data channel 2, and similarly until the eighth quadlet, which consists of the hexadecimal "48" indicated by 605 and data channel 6. The eight quadlets 601 and 602 constitute one sample 603, and similar samples 602-2 through 602-16 make up 16 samples provided in 604.

Figure 7:
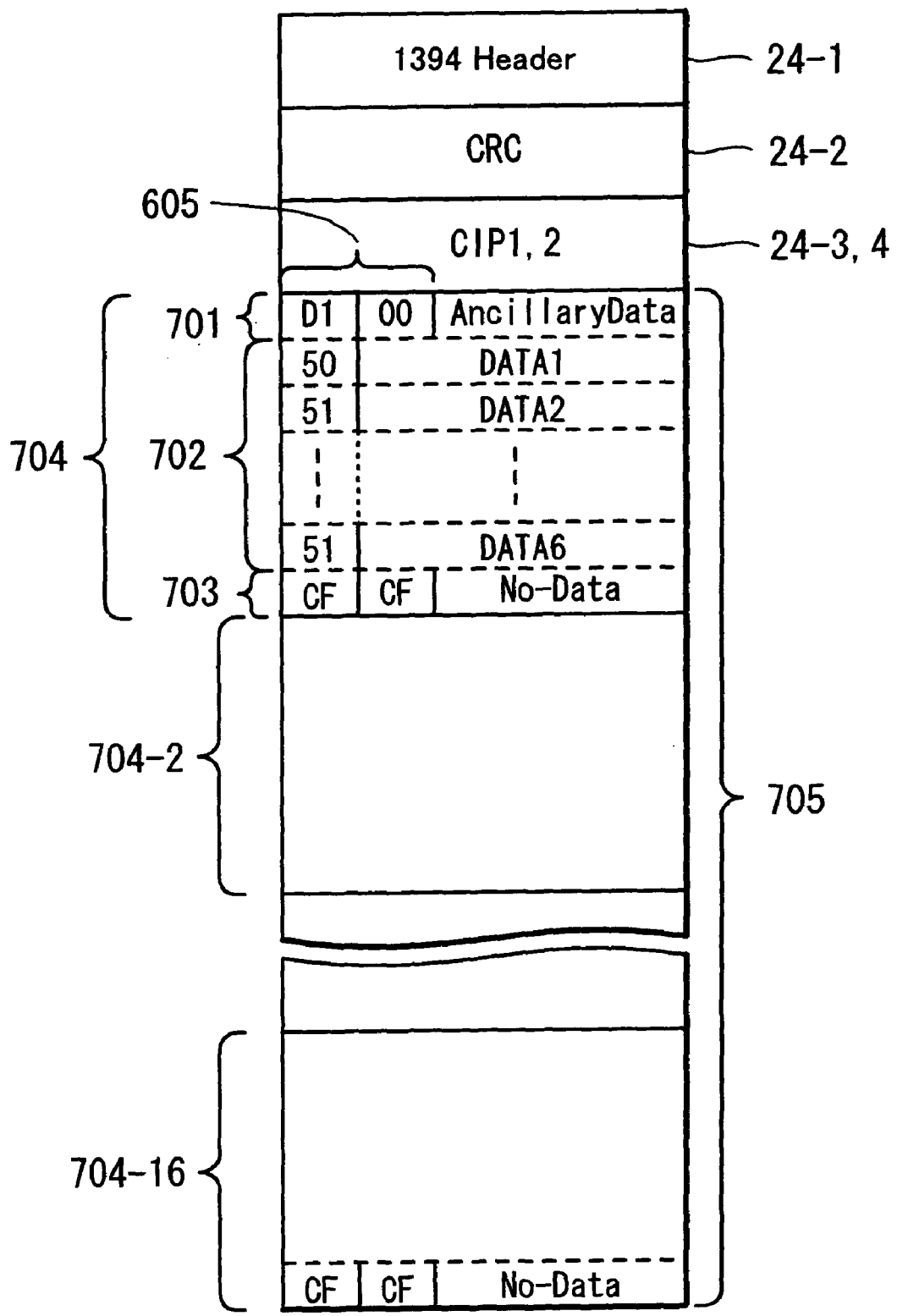
FIG. 7 shows the first packet among SACD packets.

FIG. 7 shows the first packet among SACD packets. Only the first packet of SACD audio data has the following structure.

In FIG. 7, the 1394 header 24-1, CRC 24-2, and CIP 1, 2 (24-3, 4) are similar to those shown in FIG. 3. As indicated by 701, the first quadlet consists of a hexadecimal "D100" and ancillary data; as indicated by 702, the following second quadlet consists of a hexadecimal "50" and a data 1 channel; the third quadlet consists of a hexadecimal "51" and a data 2 channel; and so on, until the seven quadlet consists of a hexadecimal "51" and a data 6 channel, and as indicated by 703, the eighth quadlet consists of a hexadecimal "CFCF" and no-data. One sample 704 consists of the eight quadlets 701, 702, 703; similar samples 704-2, . . . , 704-16 are provided in the 16 samples 705.

Figure 8:
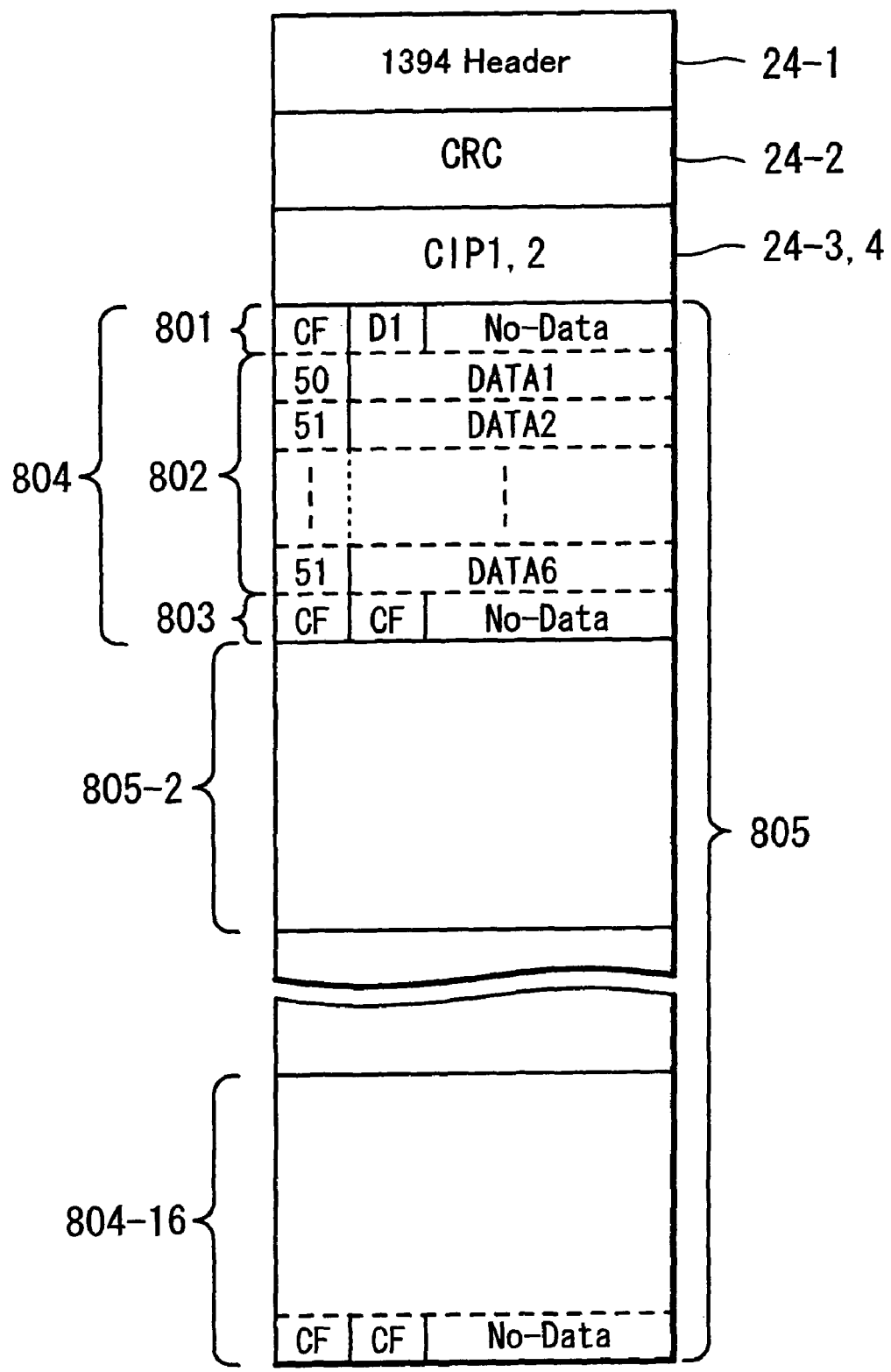
FIG. 8 shows the second and subsequent packets among SACD packets.

FIG. 8 shows the second and subsequent packets among SACD packets. The second and subsequent packets of the SACD audio data has the following structure.

In FIG. 8, the 1394 header 24-1, CRC 24-2, and CIP 1, 2 (24-3, 4) are similar to those shown in FIG. 3. As indicated by 801, the first quadlet consists of a hexadecimal "CFD1" and no-data; as indicated by 802, the following second quadlet consists of a hexadecimal "50" and a data 1 channel; the third quadlet consists of a hexadecimal "51" and a data 2 channel; and so on, until the seven quadlet consists of a hexadecimal "51" and a data 6 channel, and as indicated by 803, the eighth quadlet consists of a hexadecimal "CFCF" and no-data. One sample 804 consists of the eight quadlets 801, 802, 803; similar samples 804-2, . . . , 804-16 are provided in the 16 samples 805.

Figure 9:
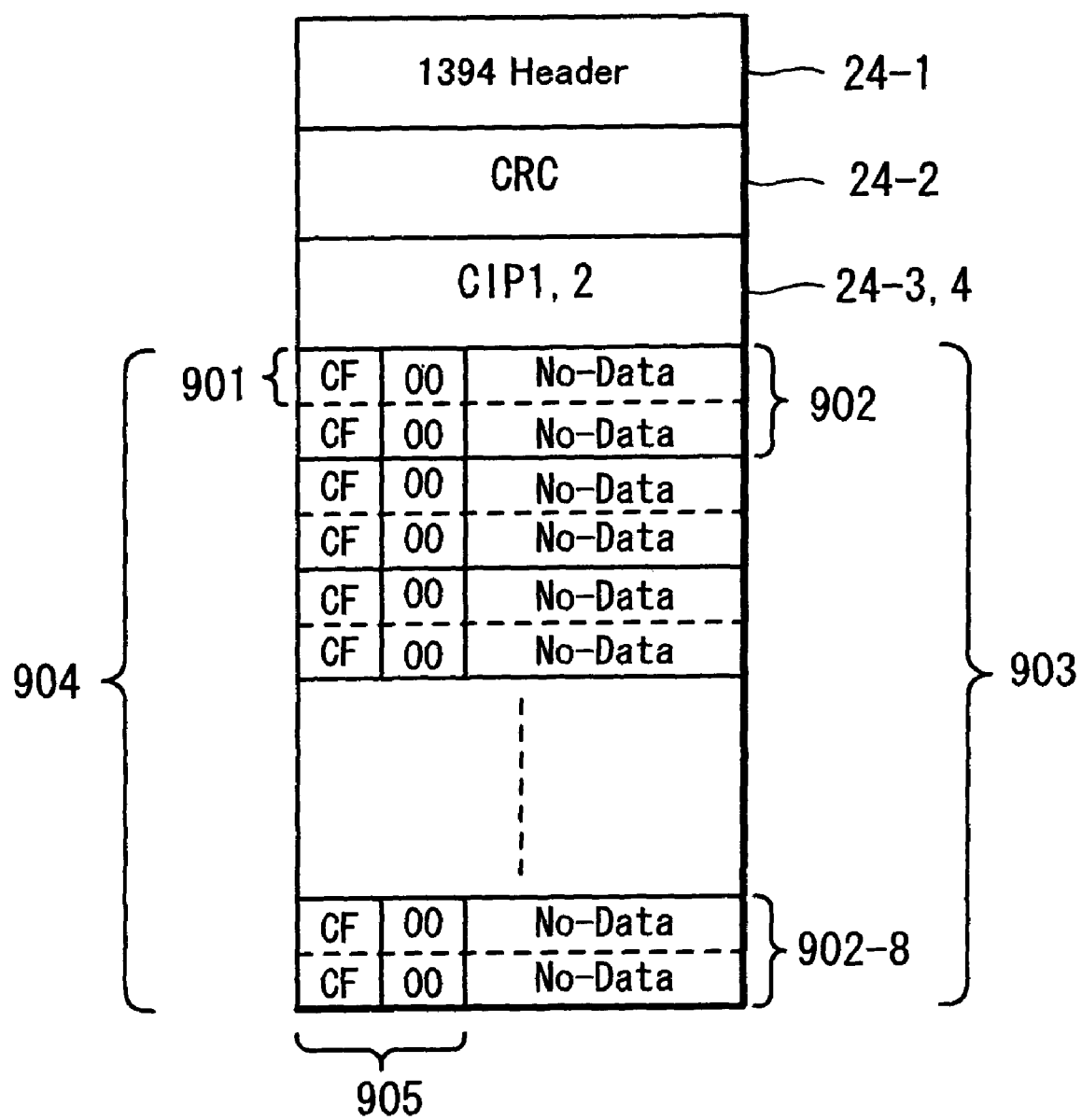
FIG. 9 shows an IEC 60958 (CD, MD) Ancillary No-data packet.

FIG. 9 shows an IEC 60958 (CD, MD) ancillary no-data packet. It is assumed that, when sending CD audio data, there is no need to send ancillary no-data indicating a stream change; however, such data may be sent. In IEC 60958 audio data, ancillary no-data must be output between data portions. Hence when IEC 60958 (CD, MD) audio data is transmitted, because there are cases in which ancillary no-data is sent, this must be detected. An IEC 60958 (CD, MD) ancillary no-data packet is a packet which is sent between transmission of data portions of IEC 60958 (CD, MD) data from the transmission device to a device on the network capable of receiving data.

In FIG. 9, the 1394 header 24-1, CRC 24-2, and CIP 1, 2 (24-3, 4) are similar to those shown in FIG. 3. The first quadlet 901 consists of a hexadecimal "CF00", indicated by 901, with no data; the following second quadlet consists of a hexadecimal "CF00" indicated by 905 and no data; this second quadlet constitutes one sample 902. 8 samples 903 up to 902-8 similar to this one sample 902 are provided, for a total of 16 quadlets 904.

Figure 10:
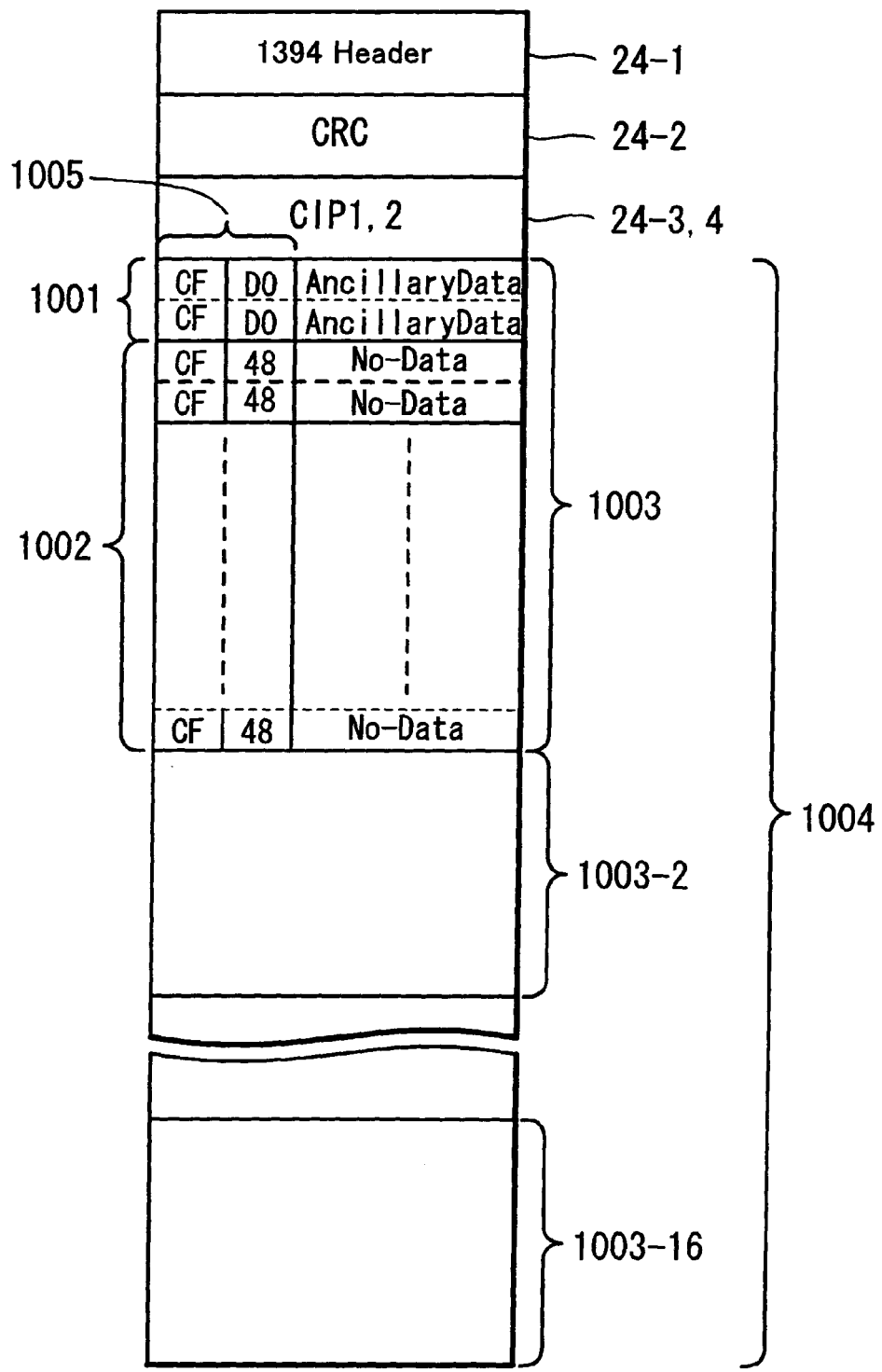
FIG. 10 shows a DVD Ancillary No-data packet.

FIG. 10 shows a DVD ancillary no-data packet. When sending DVD audio data, it is assumed that ancillary no-data indicating a stream change must be output between data portions. The DVD audio ancillary no-data packets described below are packets transmitted between transmission of DVD audio data from a transmission device to a device on the network capable of receiving data. In the case of DVD audio data, by detecting ancillary no-data together with actual data, stream changes are detected.

In FIG. 10, the 1394 header 24-1, CRC 24-2, and CIP 1, 2 (24-3, 4) are similar to those shown in FIG. 3. As indicated by 1001, first quadlet consists of a hexadecimal "CFD0", indicated by 1005 and ancillary data; the following second quadlet consists of a hexadecimal "CFD0" indicated by 1005 and ancillary data. As indicated by 1002, the third quadlet consists of a hexadecimal "CF48" indicated by 1005 and no data, the following fourth quadlet consists of a hexadecimal "CF48" indicated by 1005 and no data, and quadlets continue similarly to the eighth quadlet, consisting of a hexadecimal "CF48" indicated by 1005 and no data. One sample 1003 consists of the 8 quadlets 1001 and 1002; similar samples continue for 16 samples 1004, from 1003-2 to 1003-16.

Here, by detecting, in the second and subsequent packets, that the first quadlet consists of "CFD0" and ancillary data, the following second quadlet consists of "CFD0" and ancillary data, and that the third quadlet consists of "CF48" and no data, stream changes can be detected.

Figure 11:
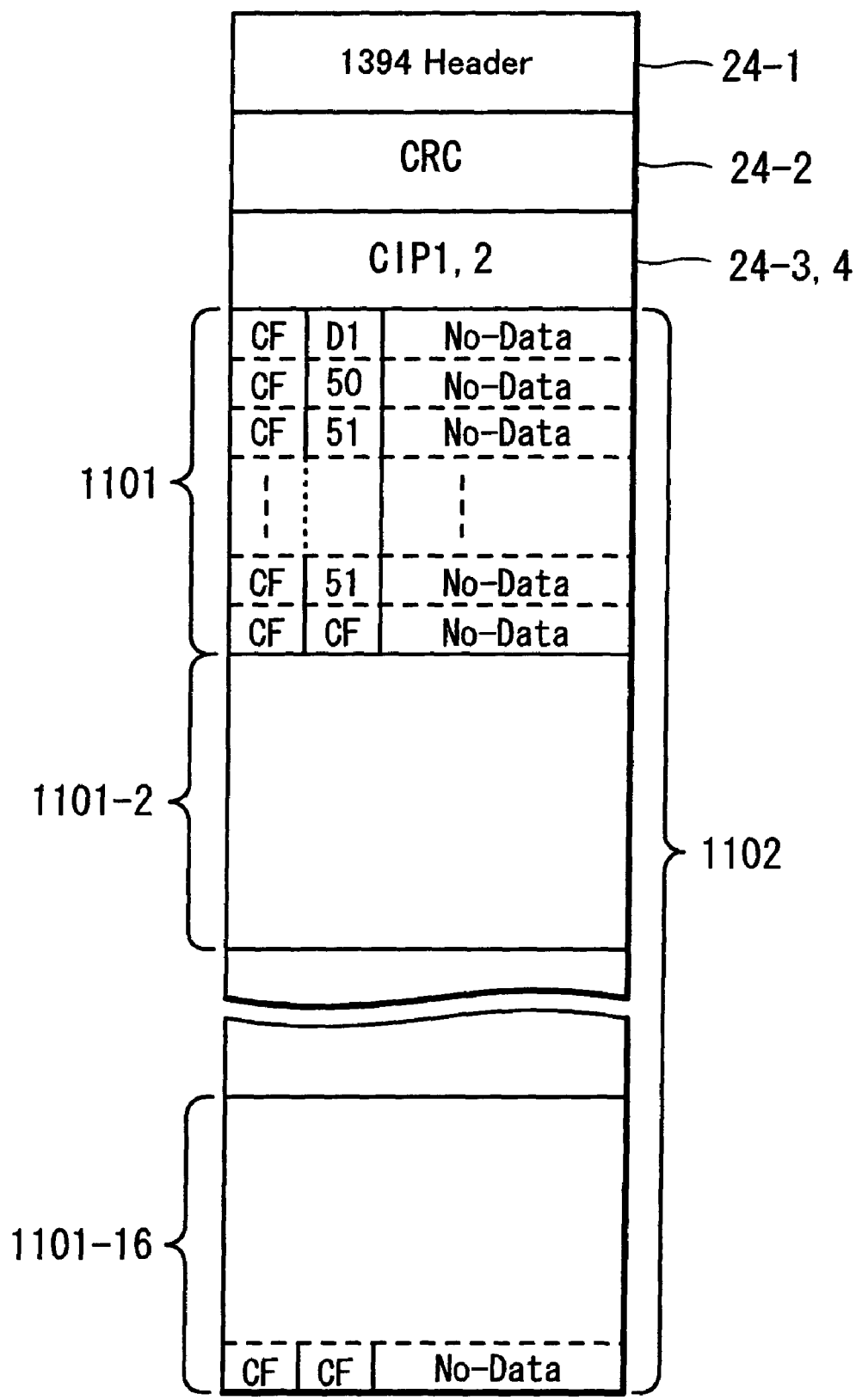
FIG. 11 shows an SACD Ancillary No-data packet.

FIG. 11 shows an SACD ancillary no-data packet. It is assumed that, when sending SACD audio data, ancillary no-data indicating a stream change must be output between data portions. The SACD audio ancillary no-data packets described below are packets transmitted between transmission of SACD audio data from a transmission device to a device on the network capable of receiving data.

In FIG. 11, the 1394 header 24-1, CRC 24-2, and CIP 1, 2 (24-3, 4) are similar to those shown in FIG. 3. As indicated by 1101, first quadlet consists of a hexadecimal "CFD1" and no data; the following second quadlet consists of a hexadecimal "CF50" and no data, the third quadlet consists of a hexadecimal "CF51" and no data, and so on until the seventh quadlet consists of a hexadecimal "CF51" and no data, and the eighth quadlet consists of a hexadecimal "CFCF" and no data. One sample 1101 consists of the eight quadlets; similar samples from 1101-2 to 1101-16 are provided in the 16 samples 1102.

Figure 12:
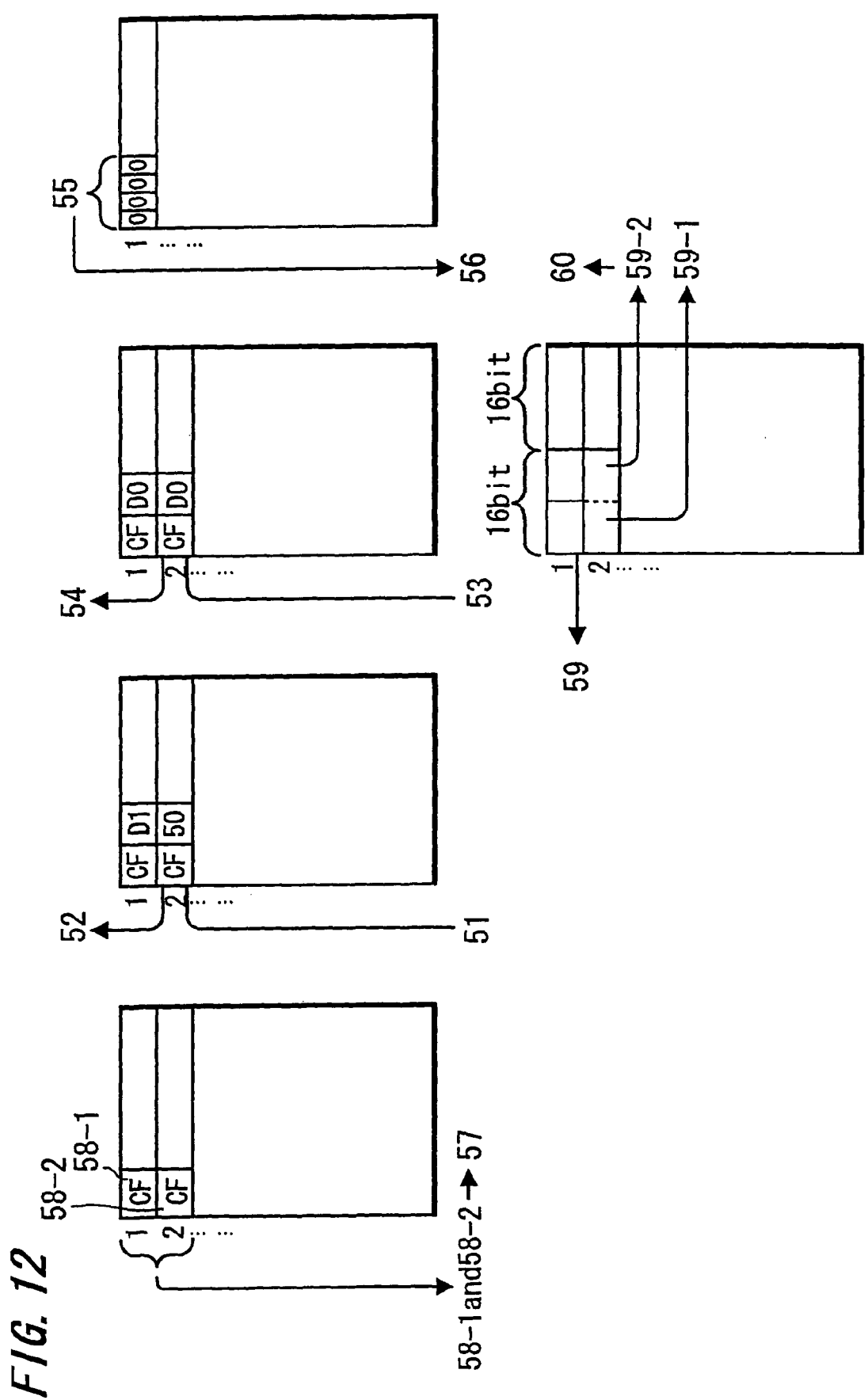
FIG. 12 shows a register for stream change detection of AM824 packet data.

FIG. 12 shows a register for stream change detection of AM824 packet data. This register is provided such that input packets can be detected from the microcontroller. Input packets and this register are in a one-to-one correspondence.

In each of the following drawings, changing the value set for a flag in each register from "0" to "1" is simply called turning on the flag for each register.

In FIG. 12, in the method of stream change detection of this aspect, CF detection means detects whether the leading byte of the first quadlet of AM824 packet data is CF58-1 and moreover the leading byte of the second quadlet is CF58-2. The CF detection means comprises, for example, a logic circuit or a software module. At this time, the CF detection means turns on RxLABEL CF57, and when the system microcontroller 14 detects the on state of RxLABEL CF57, the occurrence of a stream change in the AM824 packet data can be detected. Detection of the fact that the leading byte of the first quadlet is CF58-1 and moreover the leading byte of the second quadlet is CF58-2 can be performed by, for example, taking the output of an AND circuit the input of which is the two data items CF58-1 and CF58-2 as input to turn on RxLABEL CF57, and detecting and preferentially processing the on state of RxLABEL CF57 through interrupt processing of the system microcontroller 14.

Next, the CF50 detection means detects whether the leading two bytes of the first quadlet of the AM824 packet data are CFD1, and moreover the leading two bytes of the second quadlet are CF50. For example, the CF50 detection means comprises a logic circuit or software module. At this time, the CF50 detection means turns on the CF50 flag 51, and by detecting the on state of the CF50 flag 51, the system microcontroller 14 can detect the occurrence of a stream change of AM824 packet data to SACD data 52. Here the CF50 detection means detects, as a simple detection method, only whether the leading two bytes of the second quadlet are CF50, and turns on the CF50 flag 51.

Next, the CFD0 detection means detects whether the leading two bytes of the first quadlet of the AM824 packet data are CFD0, and moreover the leading two bytes of the second quadlet are CFD0. The CFD0 detection means comprises, for example, a logic circuit or a software module. At this time, the CFD0 detection means turns on the CFD0 flag 53, and by detecting the on state of the CFD0 flag 53, the system microcontroller 14 can detect the occurrence of stream changes in the AM824 packet data to DVD-audio data 54. Here the CFD0 detection means may detect, as a simple detection method, only whether the leading two bytes of the second quadlet are CFD0, and turn on the CFD0 flag 53.

Next, the Rx label detection means detects whether the upper four bits of the first quadlet of the AM824 packet data are 0000. The Rx label detection means comprises, for example, a logic circuit or software module. At this time, the Rx label detection means turns on RxLABEL 055, and by detecting the on state of the RxLABEL 055, the system microcontroller 14 can detect a stream change in AM824 packet data to CD/MD data (IEC 60958) 56. Detection that the upper four bits of the first quadlet are 0000 can be performed by, for example, taking the output of an AND circuit employing four data bits 0000 as negative-logic input as input to turn on RxLABEL 055, and performing detection and preferential processing through interrupt processing of the system microcontroller 14.

Of the AM824 packet data, the audio label 59-1 and audio sub-label 59-2 of the first quadlet and second quadlet are stored in the IBO register 59. At this time, the system microcontroller 14 detects the audio label 59-1 and audio sub-label 59-2 of the IBO register 59, and by this means can confirm the data format of the AM824 packet data.

Figure 13:
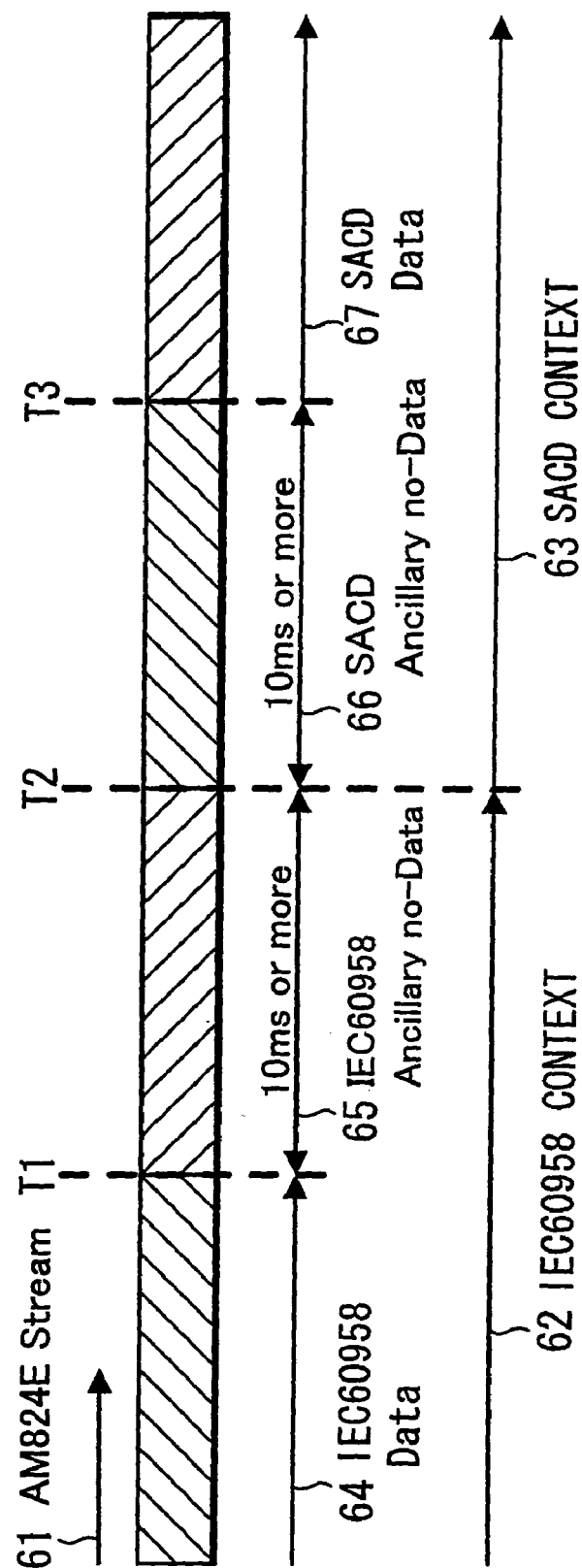
FIG. 13 shows a stream change.

FIG. 13 shows a stream change.

In FIG. 13, the stream change function for the AM824E stream 61 is explained. The ancillary no-data described below is data sent between transmission data portions from a transmission device to a device on the network capable of receiving data.

In FIG. 13, during transmission of for example IEC 60958 data 64 in an AM824E stream 61, by transmitting the IEC 60958 ancillary no-data 65 in the interval of 10 msec or longer between time T1 and time T2, and by having the transmission device transmit as special data SACD ancillary no-data 66 in the interval of 10 msec or longer between time T2 and time T3, a stream change is performed in the AM824E stream 61 from IEC 60958 data 64 to SACD data 67. In this case data prior to time T2 is defined as the IEC 60958 context 62, and data after time T2 is defined as the SACD context 63.

By this means, ancillary no-data in formats before and after conversion by the device on the data reception side can be discriminated and reception settings made, so that format conversion discrimination is possible. Also, stream changes can be detected using data with few combinations, and, at this time, by turning on various flags in the above-described registers to enable easy detection by the system microcontroller 14, the load on the host controller can be alleviated.

Next, judgment of the format of packet data being received through operation of the microcontroller using the registers is explained. The following processing and judgment are performed by, for example, a microcontroller, but the present invention is not thus limited, and other judgment means may be used, so long as judgments of the formats of packet data allocated to registers can be made from the states of the registers.

Figure 14:
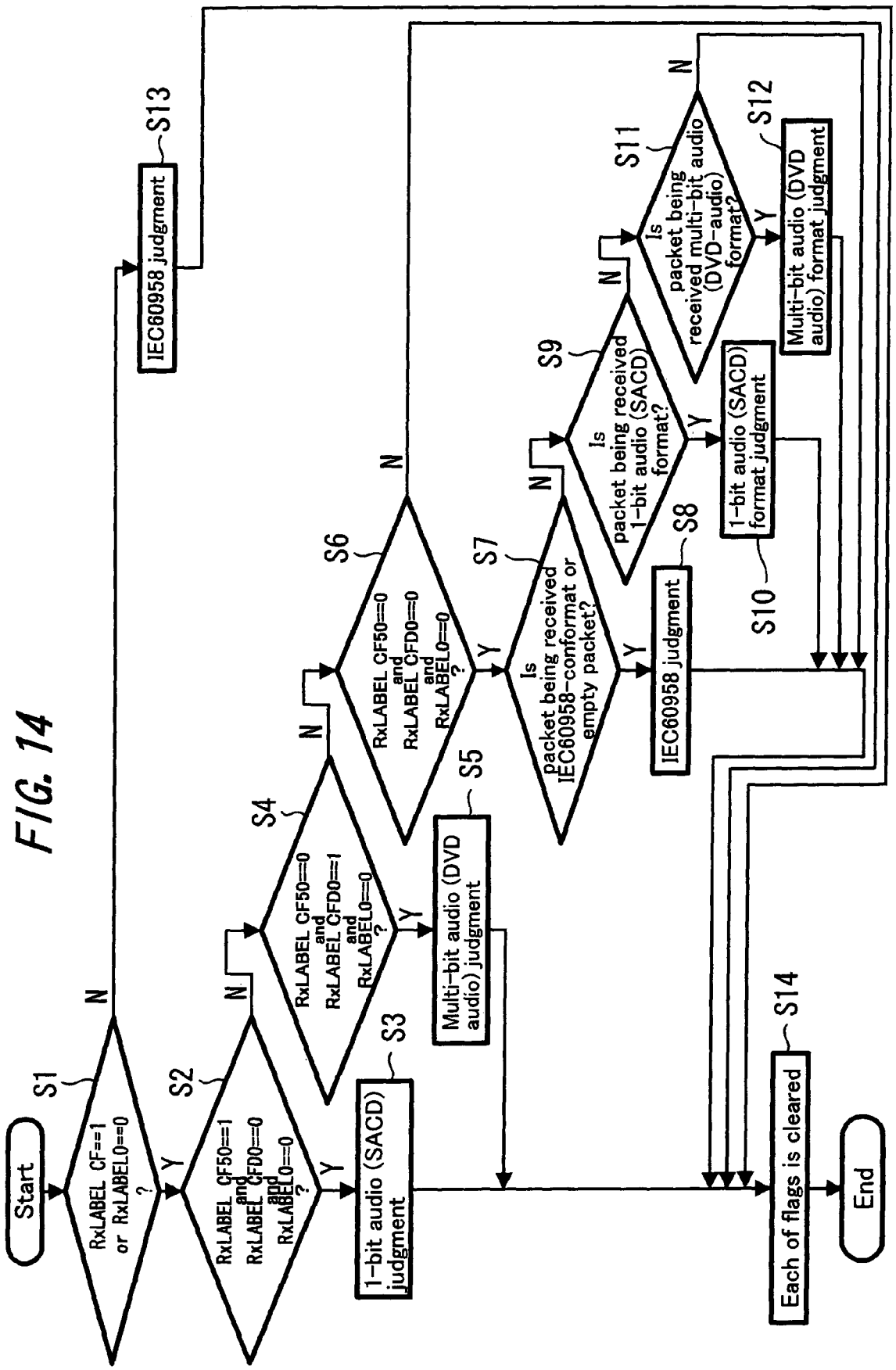
FIG. 14 is a flowchart showing the operation to judge packet data formats using a register.

FIG. 14 is a flowchart showing the operation to judge packet data formats using a register.

In FIG. 14, in step S1 a judgment as to whether RxLABEL CF=1 or RxLABEL0=0 is made.

In step S1, if RxLABEL CF=1 or RxLABEL0=0, processing proceeds to step S2, and in step S2, a judgment is made as to whether RxLABEL CF50=1 and moreover RxLABEL CFD0=0 and moreover RxLABEL0=0.

In step S2, when RxLABEL CF50=1 and moreover RxLA-BEL CFD0=0 and moreover RxLABEL0=0, processing proceeds to step S3, and in step S3, a judgment is made as to whether the packet data is in a 1-bit audio (SACD) format.

When in step S1 it is not the case that RxLABEL CF=1 or that RxLABEL0=0, processing proceeds to step S13, and in step S13, a judgment is made as to whether the packet data is in an IEC 60958 format.

In step S2, when it is not the case that RxLABEL CF50=1 and moreover RxLABEL CFD0=0 and moreover RxLABEL0=0, processing proceeds to step S4, and in step S4, a judgment is made as to whether RxLABEL CF50=0 and moreover RxLABEL CFD0=1 and moreover RxLABEL0=0.

In step S4, when RxLABEL CF50=0 and moreover RxLABEL CDD0=1 and moreover RxLABEL0=0, processing proceeds to step S5, and in step S5 the packet data is judged to be in a multi-bit audio (DVD audio) format.

In step S4, when it is not the case that RxLABEL CF50=0 and moreover RxLABEL CFD0=1 and moreover RxLABEL0=0, processing proceeds to step S6, and in step S6 a judgment is made as to whether RxLABEL CF50=0 and moreover RxLABEL CFD0=0 and moreover RxLABEL0=0.

In step S6, when RxLABEL CF50=0 and moreover RxLABEL CFD0=0 and moreover RxLABEL0=0, processing proceeds to step S7, and in step S7 a judgment is made as to whether the packet being received is IEC 60958-conformant or is an empty packet.

In step S7, when the packet being received is IEC 60958-conformant or is an empty packet, processing proceeds to step S8, and in step S8, the packet data is judged to be in the IEC 60958 format.

In step S7, if it is not the case that the packet being received is IEC 60958-conformant or is an empty packet, processing proceeds to step S9, and in step S9, a judgment is made as to whether the packet being received is in a 1-bit audio (SACD) format.

In step S9, when the packet being received is in a 1-bit audio (SACD) format, processing proceeds to step S10, and in step S10, the packet data is judged to be in a 1-bit audio (SACD) format.

In step S9, when the packet being received is not in a 1-bit audio (SACD) format, processing proceeds to step S11, and in step S11, a judgment is made as to whether the packet being received is in a multi-bit audio (DVD audio) format.

In step S11, when the packet being received is in a multi-bit audio (DVD audio) format, processing proceeds to step S12, and in step S12, the packet data is judged to be in a multi-bit audio (DVD audio) format.

After the judgment of a 1-bit audio (SACD) format in step S3, the judgement of a multi-bit audio (DVD audio) format in step S5, the judgment of an IEC 60958 format in step S8, the judgment of a 1-bit audio (SACD) format in step S10, the judgment of a multi-bit audio (DVD audio) format in step S12, and the judgment of an IEC 60958 format in step S13, processing proceeds to step S14, and in step S14, each of the flags is cleared.

Next, examples of stream changes among various formats of packet data being received are explained.

In the following drawings, detection, judgment, and other operations may be performed by, for example, a microcontroller; however, this invention is not thereby limited, and other judgment means may be used, so long as judgments of the formats of packet data allocated to registers can be made from the states of the registers.

Figure 15:
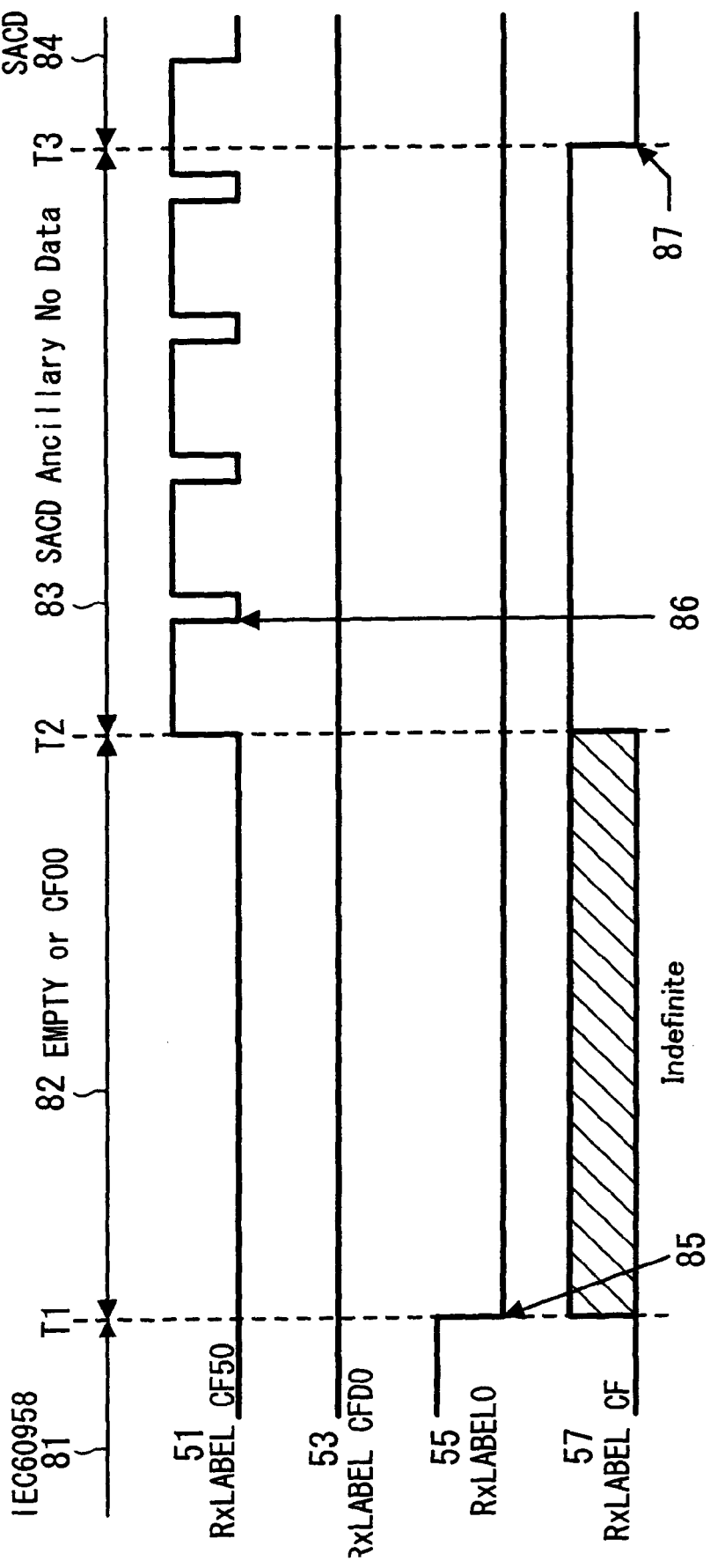
FIG. 15 is a drawing showing an example of a stream change from IEC 60958 to SACD.

FIG. 15 is a drawing showing an example of a stream change in which packet data changes from IEC 60958 format to SACD format.

In FIG. 15, prior to the time T1, RxLABEL CF50=0, RxLABEL CFD0=0, RxLABEL0=1, and RxLABEL CF=0, so that the format of the received packet data is the IEC 60958 (81) state. This state is the state in which packet data is judged in step S13 to be in IEC 60958 format as a result of a "NO" branch in step S1 of the flowchart of the above-described FIG. 7.

At time T1, as indicated by 85, the value of RxLABEL0 changes from 1 (on) to 0 (off), so that a stream change ending IEC60958 Conformant data is detected.

At this time, as shown in FIG. 12, the RxLABEL detection means detects that the leading byte of the first quadlet among the packet data is 0000, and the RxLABEL detection means turns on RxLABEL055 and by detecting the on state of RxLABEL055, the system microcontroller 14 as a judgment means detects a stream change where the CD/MD data (IEC60958) 56 end.

In the interval from time T1 to time T2, RxLABEL CF50=0, RxLABEL CFD0=0, RxLABEL0=0, and RxLABEL CF=indefinite, so that the received packet data is in the state of an empty packet 82. This state is the state in which empty packet data is judged in step S7 as a result of a "YES" branch in step S6 of the flowchart of the above-described FIG. 7.

In the interval from time T2 to time T3, RxLABEL CF50=1, RxLABEL CFD0=0, RxLABEL0=0, and RxLABEL CF=1, so that the received packet data is in the state of SACD ancillary no-data 83.

At this time, as shown in FIG. 12, the CF detection means detects that the leading byte of the first quadlet among the packet data is CF58-1 and that the leading byte of the second quadlet is CF58-2, and the CF detection means turns on RxLABEL CF57, so that the system microcontroller 14, by detecting the on state of RxLABEL CF57, detects the occurrence of a stream change in the packet data.

Next, the CF50 detection means detects that the leading 2 bytes of the first quadlet among the packet data are CFD1 and the leading 2 bytes of the second quadlet are CF50, and the CF50 detection means turns on the CF50 flag; the system microcontroller 14, by detecting the on state of the CF50 flag 51, detects the occurrence of a stream change in the AM82 packet data to SACD data 52.

As indicated by 86, the RxLABEL on state is one CF50 only, so that the packet data is judged to be the SACD format of the on state of this RxLABEL CF50. At this time, the received packet is confirmed, the data length is confirmed, and the IEEE 1394 microcontroller 13 shown in FIG. 1 sets the IEEE 1394 link chip 12 to the SACD 84 format reception state.

At time T3, RxLABEL CF50=0, RxLABEL CFD0=0, RxLABEL0=0, and RxLABEL CF=0, so that the received packet data is in the state of the SACD format. This state is the state in which the packet data is judged to be in 1-bit audio (SACD) format in step S3, as a result of a "YES" branch in step S2 of the flowchart in the above-described FIG. 7.

As indicated by 87, the value of RxLABEL CF has changed from 1 (on) to 0 (off), and so it is judged that a stream change from IEC 60958-conformant to SACD has ended.

Figure 16:
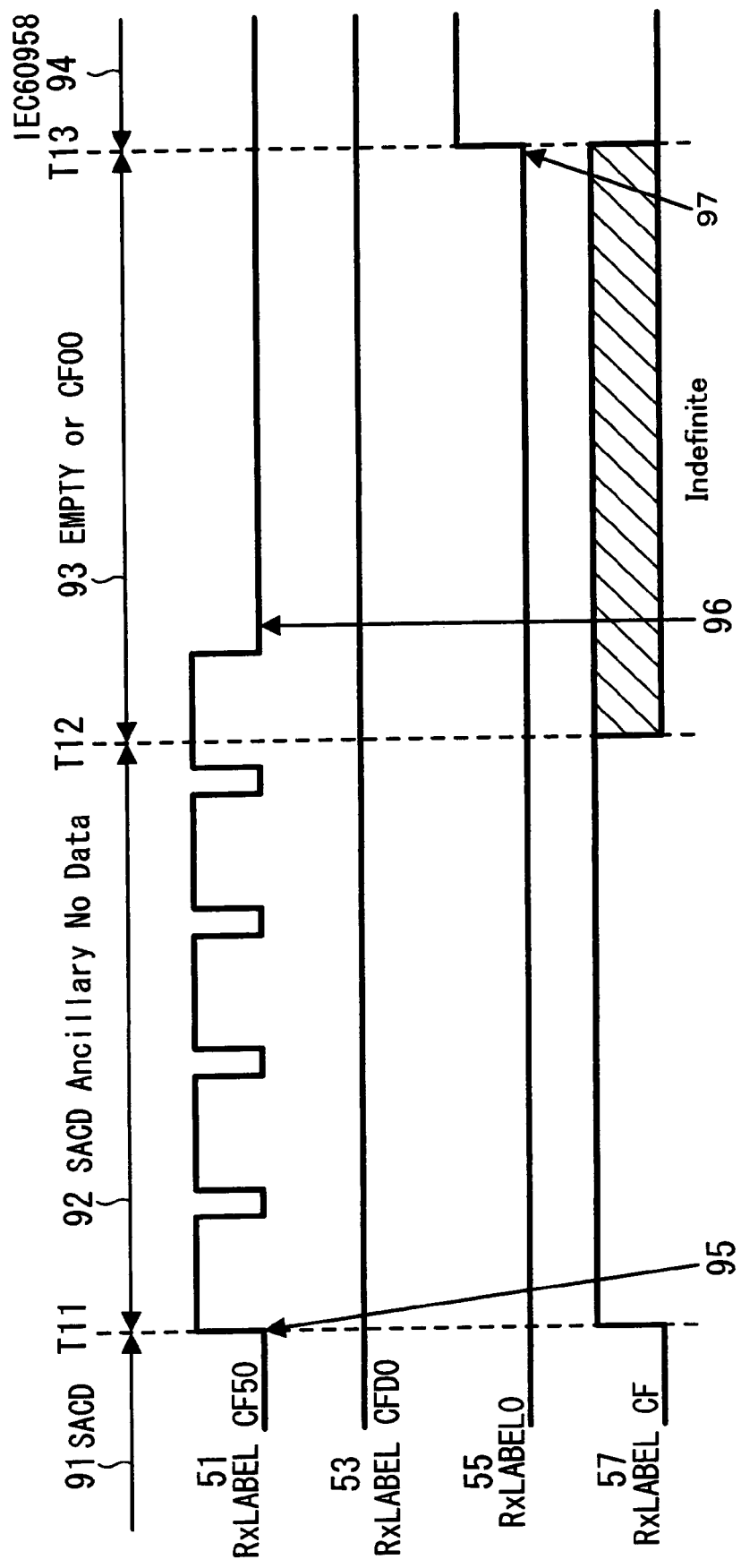
FIG. 16 is a drawing showing an example of a stream change from SACD to IEC 60958.

FIG. 16 is a drawing showing an example of a stream change of packet data from SACD format to IEC 60958 format.

In FIG. 16, prior to the time T1, RxLABEL CF50=0, RxLABEL CFD=0, RxLABEL0=0, and RxLABEL CF=0, so that the format of the received packet data is the state of SACD 91. This state is the state in which packet data is judged in step S10 to be in the 1-bit audio (SACD) format as a result of a "YES" branch in step S9 of the flowchart of the above-described FIG. 7.

At time T1, as indicated by 95, the value of RxLABEL CF50 changes from 0 (off) to 1 (on), so that a stream change ending SACD 91 data is detected.

At this time, as shown in FIG. 12, the CF detection means detects that the leading byte of the first quadlet among the packet data is CF58-1 and that the leading byte of the second quadlet is CF58-2, and the CF detection means turns on RxLABEL CF57; the system microcontroller 14, by detecting the on state of RxLABEL CF57, detects that a stream change has occurred in the packet data.

Next, the CF50 detection means detects that the leading two bytes of the first quadlet of the packet data are CFD1 and that the leading two bytes of the second quadlet are CF50, and the CF50 detection means turns on the CF50 flag 51; the system microcontroller 14, by detecting the on state of the CF50 flag 51, detects the occurrence of a stream change in the AM824 packet data to SACD data 52.

In the interval from time T11 to time T12, RxLABEL CF50=1, RxLABEL CFD0=0, RxLABEL0=0, and RxLABEL CF=1, so that the received packet data is in the state of SACD ancillary no-data 92.

In the interval from time T12 to time T13, RxLABEL CF50=0, RxLABEL CFD0=0, RxLABEL0=0, and RxLABEL CF=indefinite, so that the received packet data is in the state of the empty packet 93. This state is the state in which a packet is judged in step S7 to be an empty packet as a result of a "YES" branch in step S6 of the flowchart of the above-described FIG. 7.

As indicated by 96, all RxLABEL flags are in the off state, so that data being received is judged to be IEC 60958-conformant data. Further, because RxLABEL0=0, a stream change is judged to occur. In order to reliably identify the data, the audio label and sub-label of the data being received are investigated, and the IEEE 1394 microcontroller 13 shown in FIG. 1 sets the IEEE 1394 link chip 12 into the IEC 60958-conformant 94 reception state.

At this time, the Rx label detection means detects that the upper four bits of the first quadlet of the packet data are 0000, and the Rx label detection means turns on RxLABEL 055; as the judgment means, the system microcontroller 14 detects the on state of RxLABEL 055, and in this way detects a stream change to CD/MD data (IEC 60958) 56.

Further, the audio label 59-1 and audio sub-label 59-2 of the first quadlet and second quadlet of the packet data are stored in the IBO register 59, and by examining the audio label 59-1 and audio sub-label 59-2 in the IBO register 59, the system microcontroller 14 confirms the data format of the packet data.

At time T13, RxLABEL CF50=0, RxLABEL CFD0=0, RxLABEL0=1, and RxLABEL CF=0, so that received packet data is in the IEC 60958-conformat 94 state. This state is the state in which packet data is judged in step S13 to be in IEC 60958 format as a result of a "NO" branch in step S1 of the flowchart of the above-described FIG. 7.

As indicated by 97, the value of RxLABEL 0 changes from 0 (off) to 1 (on), so that it is judged that a stream change from SACD to IEC 60958-conformant format has ended.

Figure 17:
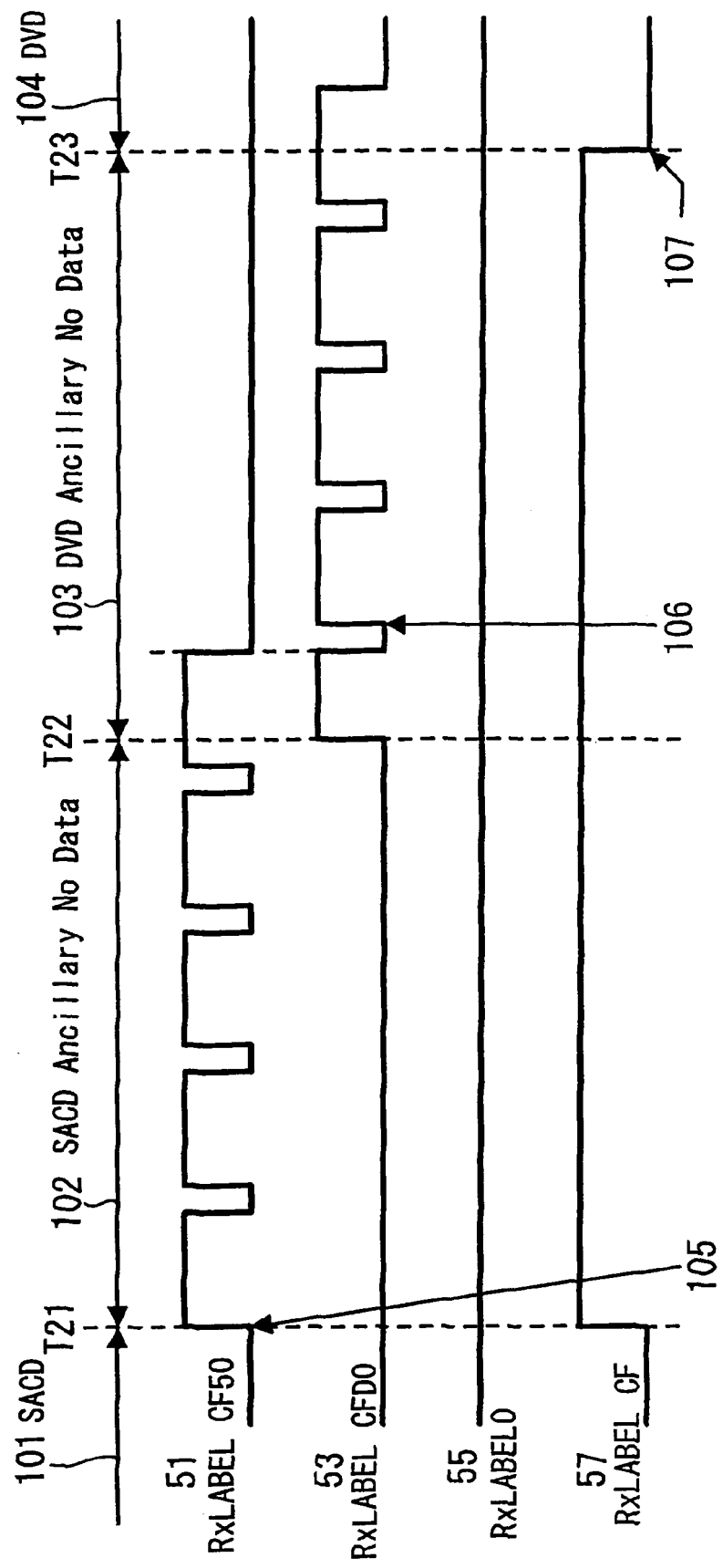
FIG. 17 is a drawing showing an example of a stream change from SACD to DVD.

FIG. 17 is a drawing showing an example of a stream change of packet data from SACD format to DVD format.

In FIG. 17, prior to time T21, RxLABEL CF50=0, RxLABEL CDD0=0, RxLABEL0=0, and RxLABEL CF=0, so that the format of the received packet data is the SACD 101 state. This state is the state in which packet data is judged in step S10 to be in 1-bit audio (SACD) format as a result of a "YES" branch in step S9 of the flowchart of the above-described FIG. 7.

At time T21, as indicated by 105, the value of RxLABEL CF50 has changed from 0 (off) to 1 (on), so that a stream change ending SACD 101 data is detected.

At this time, as shown in FIG. 12, the CF detection means detects that the leading byte of the first quadlet of the packet data is CF58-1 and moreover that the leading byte of the second quadlet is CF58-2, and the CF detection means turns on RxLABEL CF57; the system microcontroller 14, by detecting the on state of RxLABEL CF57, detects the occurrence of a stream change in the packet data.

Next, the CF50 detection means detects the face that the leading two bytes of the first quadlet of the packet data are CFD1 and that the leading two bytes of the second quadlet are CF50, and the CF50 detection means turns on the CF50 flag 51; the system microcontroller 14, by detecting the on state of the CF50 flag 51, detects a stream change ending the SACD data 52.

In the interval from time T21 to time T22, RxLABEL CF50=1, RxLABEL CFD0=0, RxLABEL0=0, and RxLABEL CF=1, so that the received packet data is in the SACD ancillary no-data 102 state.

In the interval from time T22 to time T23, RxLABEL CF50=0, RxLABEL CFD0=1, RxLABEL0=0, and RxLABEL CF=1, so that the received packet data is in the DVD ancillary no-data 103 state.

At this time, as shown in FIG. 12, the CF detection means detects that the leading byte of the first quadlet of the packet data is CF58-1 and moreover that the leading byte of the second quadlet is CF58-2, and the CF detection means turns on RxLABEL CF57; the system microcontroller 14, by detecting the on state of RxLABEL CF57, can detect the occurrence of a stream change in the packet data.

Next, the CFD0 detection means detects that the two leading bytes of the first quadlet of the packet data are CFD0 and that the two leading bytes of the second quadlet are CFD0. At this time, the CFD0 detection means turns on the CFD0 flag 53, and the system microcontroller 14, by detecting the on state of the CFD0 flag 53, detects that a stream change has occurred in the packet data to the DVD audio data format 54.

As indicated by 106, there is only one RxLABEL on state, for CFD0, so that the packet data is judged to be in the DVD format with the RxLABEL CFD0 in the on state. At this time, the received packet is confirmed, the data length is confirmed, and the IEEE 1394 microcontroller 13 shown in FIG. 1 sets the IEEE 1394 link chip 12 to the DVD 104 format reception state.

At time T23, RxLABEL CF50=0, RxLABEL CFD0=1, RxLABEL0=0, and RxLABEL CF=0, so that the received packet data is in the DVD 104 state. This state is the state in which packet data is judged in step S5 to be in the multi-bit audio (DVD audio) format as a result of a "YES" branch in step S4 of the flowchart of the above-described FIG. 7.

As indicated by 107, the value of RxLABEL CF has changed from 1 (on) to 0 (off), so that it is judged that a stream change from SACD 101 to DVD 104 has ended.

Figure 18:
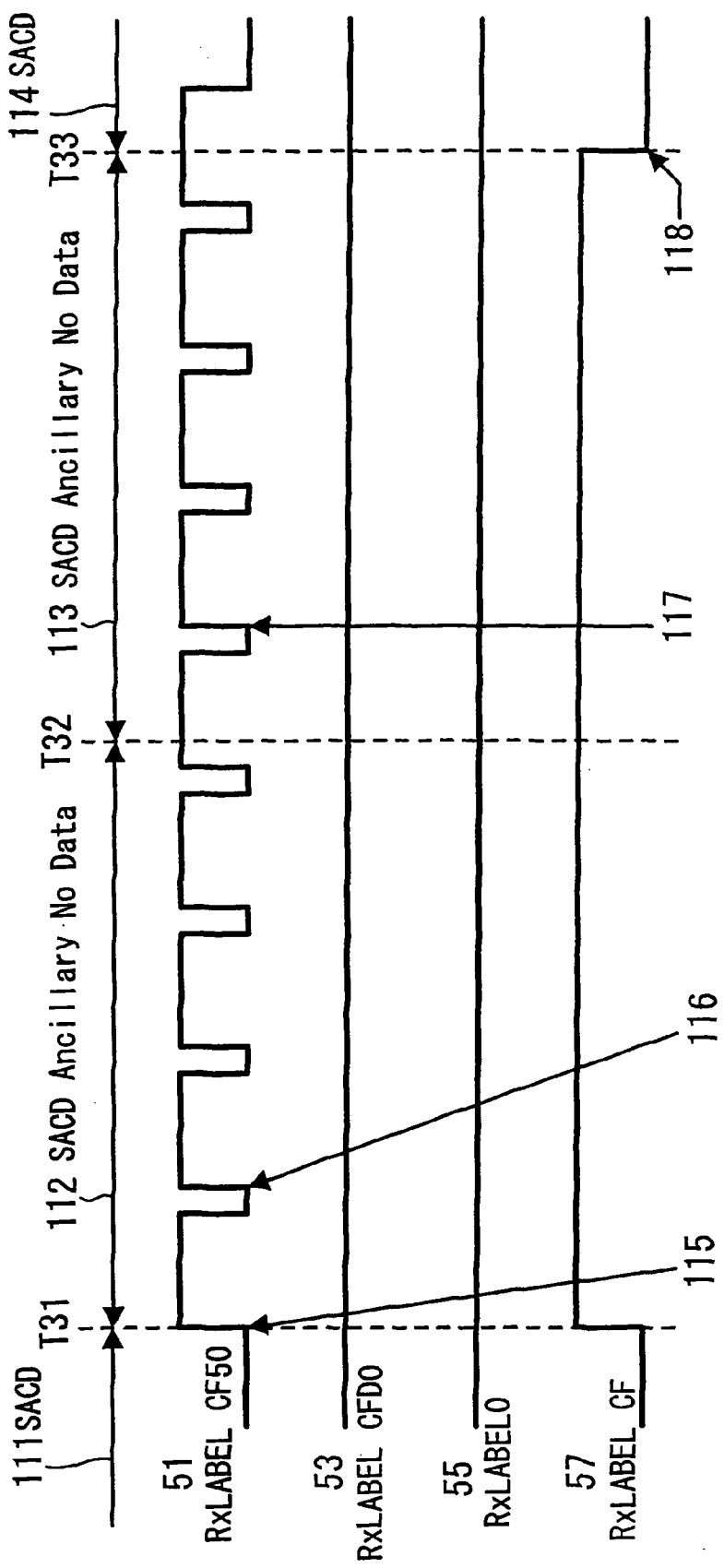
FIG. 18 is a drawing showing an example of a stream change from SACD 5-channel format to SACD 6-channel format.

FIG. 18 is a drawing showing an example of a stream change of packet data from SACD 5-channel format to SACD 6-channel format.

In FIG. 18, prior to time T31, RxLABEL CF50=0, RxLABEL CFD0=0, RxLABEL0=0, and RxLABEL CF=0, so that the format of received packet data is in the SACD 111 state. This state is the state in which packet data is judged in step S10 to be in 1-bit audio (SACD) format as a result of a "YES" branch in step S9 of the flowchart of the above-described FIG. 7.

At time T31, as indicated by 115, the value of RxLABEL CF50 changes from 0 (off) to 1 (on), so that a stream change ending the SACD 111 data is detected.

At this time, as shown in FIG. 12, the CF detection means detects that the leading byte of the first quadlet of the packet data is CF58-1 and moreover the leading byte of the second quadlet is CF58-2, and the CF detection means turns on RxLABEL CF57, so that the system microcontroller 14, by detecting the on state of RxLABEL CF57, can detect that a stream change in the packet data has occurred.

Next, the CF50 detection means detects that the leading two bytes of the first quadlet of the packet data are CFD1 and that the leading two bytes of the second quadlet are CF50, and the CF50 detection means turns on the CF50 flag 51; the system microcontroller 14, by detecting the on state of the CF50 flag 51, detects a stream change ending the SACD data 52.

In the interval from time T31 to time T32, RxLABEL CF50=1, RxLABEL CFD0=0, RxLABEL0=0, and RxLABEL CF=1, so that the received packet data is in the SACD ancillary no-data 112 state.

As indicated by 116, the only RxLABEL on state is CF50, and so the format is set to the SACD format of this RxLABEL CF50 on state. At this time, the received packet is confirmed, the data length is confirmed, and the IEEE 1394 microcontroller 13 shown in FIG. 1 sets the IEEE 1394 link chip 12 to the SACD 111 format reception state.

During the interval from time T32 to time T33, RxLABEL CF50=1, RxLABEL CFD0=0, RxLABEL0=0, and RxLABEL CF=1, so that received packet data is in the SACD ancillary no-data 113 state.

At this time, as shown in FIG. 12, the CF detection means detects that the leading byte of the first quadlet of the packet data is CF58-1 and moreover that the leading byte of the second quadlet is CF58-2, and the CF detection means turns on RxLABEL CF57; the system microcontroller 14, by detecting the on state of RxLABEL CF57, can detect that a stream change has occurred in the packet data.

Next, the CF50 detection means detects that the leading two bytes of the first quadlet of the packet data are CFD1 and that the leading two bytes of the second quadlet are CF50, and the CF50 detection means turns on the CF50 flag 51; the system microcontroller 14, by detecting the on state of the CF50 flag 51, detects a stream change to SACD data 52.

Here, as indicated by 117, the IEEE 1394 microcontroller 13 repeats the operation of setting the IEEE 1394 link chip 12 into the SACD format reception state, but the data length changes, and so a change in the number of channels is detected.

At time T33, RxLABEL CF50=0, RxLABEL CFD0=0, RxLABEL0=0, and RxLABEL CF=0, so that the received packet data is in the SACD state. This state is the state in which packet data is judged in step S3 to be in the 1-bit audio (SACD) format as a result of a "YES" branch in step S2 of the flowchart of the above-described FIG. 7.

As indicated by 118, the value of RxLABEL CF changes from 1 (on) to 0 (off), so that a stream change from SACD 5-channel (111) format to SACD 6-channel (114) format is judged to have ended.

Figure 19:
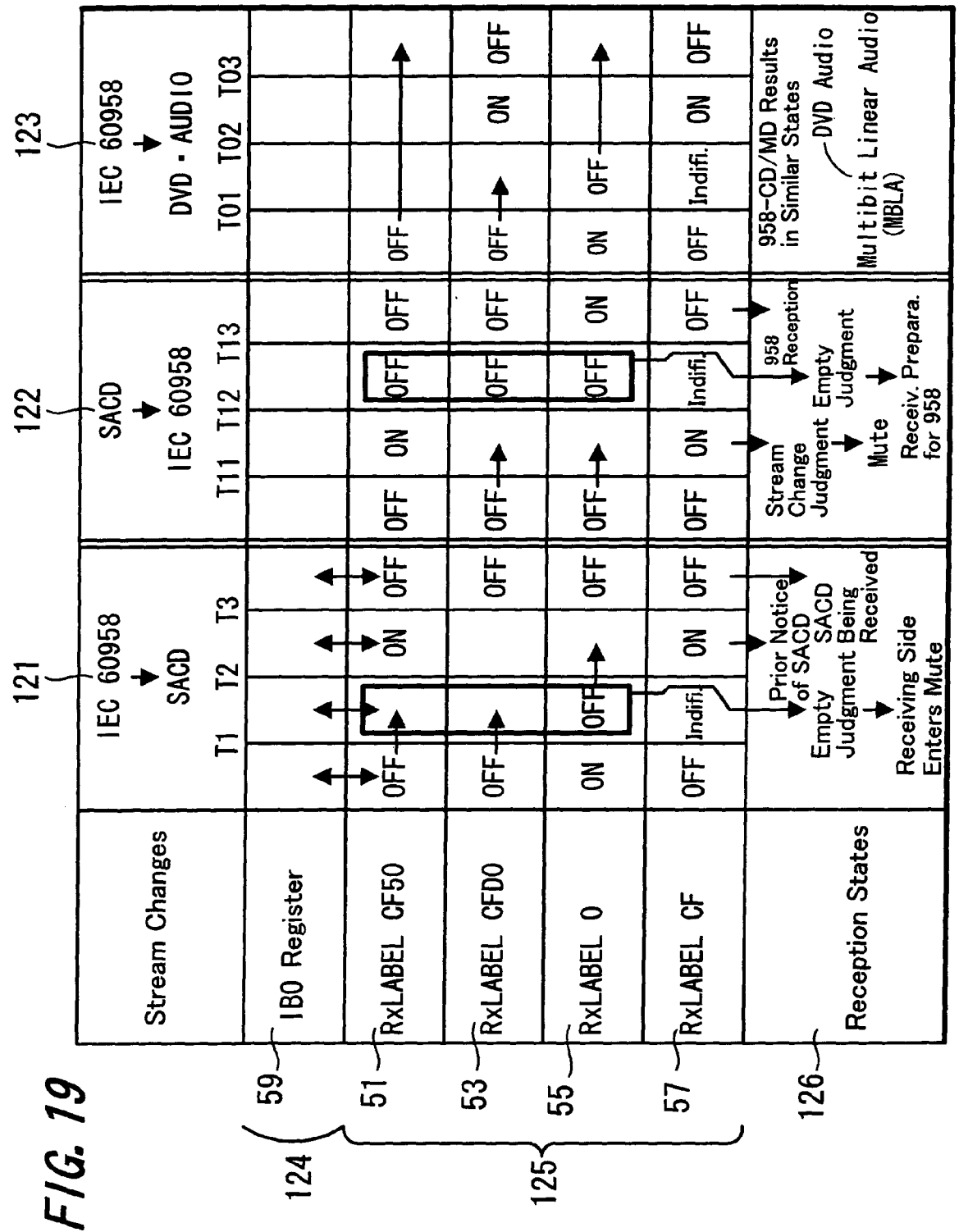
FIG. 19 is a drawing showing a reception state when a receiver receives stream data; and, FIG. 20 is a drawing showing a reception state when a receiver receives stream data.

FIG. 19 is a drawing showing a reception state when a receiver receives stream data.

In FIG. 19, the IBO register 59 is a confirmation register 124, and the RxLABEL CF50 (51), RxLABEL CFD0 (53), RxLABEL0 (54), and RxLABEL CF (57) are in the trigger detection register 125.

Below, reception states 126 in each of the stream changes 121 to 123 are explained.

In FIG. 19, a stream change in the packet data indicated by 121 (from the IEC 60958 format to the SACD format) is the reception state, in the multiformat-compatible receiver 11 shown in FIG. 1, for the case in which the packet data shown in the above-described FIG. 15 undergoes a stream change from the IEC 60958 format to the SACD format.

In a stream change (from the IEC 60958 format to the SACD format) in the packet data indicated by 121 in FIG. 19, during the interval from time T1 to time T2, when the trigger detection register 125 detects that RxLABEL CF50 (51)=off, RxLABEL CFD0 (53)=off, and RxLABEL0 (54)=off, as indicated by 126, the received packet is judged to be an empty packet, and the receiving side enters a mute state, in which audio is not output.

During the interval from time T2 to time T3, when the trigger detection register 125 detects that RxLABEL CF50 (51)=on, RxLABEL CFD0 (53)=off, RxLABEL0 (54)=off, and RxLABEL CF (57)=on, as indicated by 126, prior notice is given that the received packet is in SACD format.

During the interval following time T3, when the trigger detection register 125 detects that RxLABEL CF50 (51)=off, RxLABEL CFD0 (53)=off, RxLABEL0 (54)=off, and RxLABEL CF (57)=off, as indicated by 126, a state is entered in which an SACD format reception packet is being received.

In FIG. 19, the packet data stream change indicated by 122 (from SACD format to IEC 60958 format) is a reception state in the multiformat-compatible receiver 11, shown in FIG. 1, for the case of a stream change in the packet data from SACD format to IEC 60958 format as shown in the above-described FIG. 16.

In a stream change (from SACD format to IEC 60958 format) in the packet data indicated by 122 in FIG. 19, during the interval from time T1 to time T2, when the trigger detection register 125 detects that RxLABEL CF50 (51)=on, RxLABEL CFD0 (53)=off, RxLABEL0 (54)=off, and RxLABEL CF (57)=on, as indicated by 126, the received packet is judged to be in a stream change state, and the receiving side enters a mute state in which audio is not output.

During the interval from time T12 to time T13, when the trigger detection register 125 detects that RxLABEL CF50 (51)=off, RxLABEL CFD0 (53)=off, and RxLABEL0 (54) =off, as indicated by 126, the received packet is judged to be an empty packet, and the receiving side enters a state of preparation for reception of packet data in the IEC 60958 format.

During the interval following time T13, when the trigger detection register 125 detects that RxLABEL CF50 (51)=off, RxLABEL CFD0 (53)=off, RxLABEL0 (54)=on, and RxLABEL CF (57)=off, as indicated by 126, an IEC 60958 format reception packet is being received.

Figure 20:
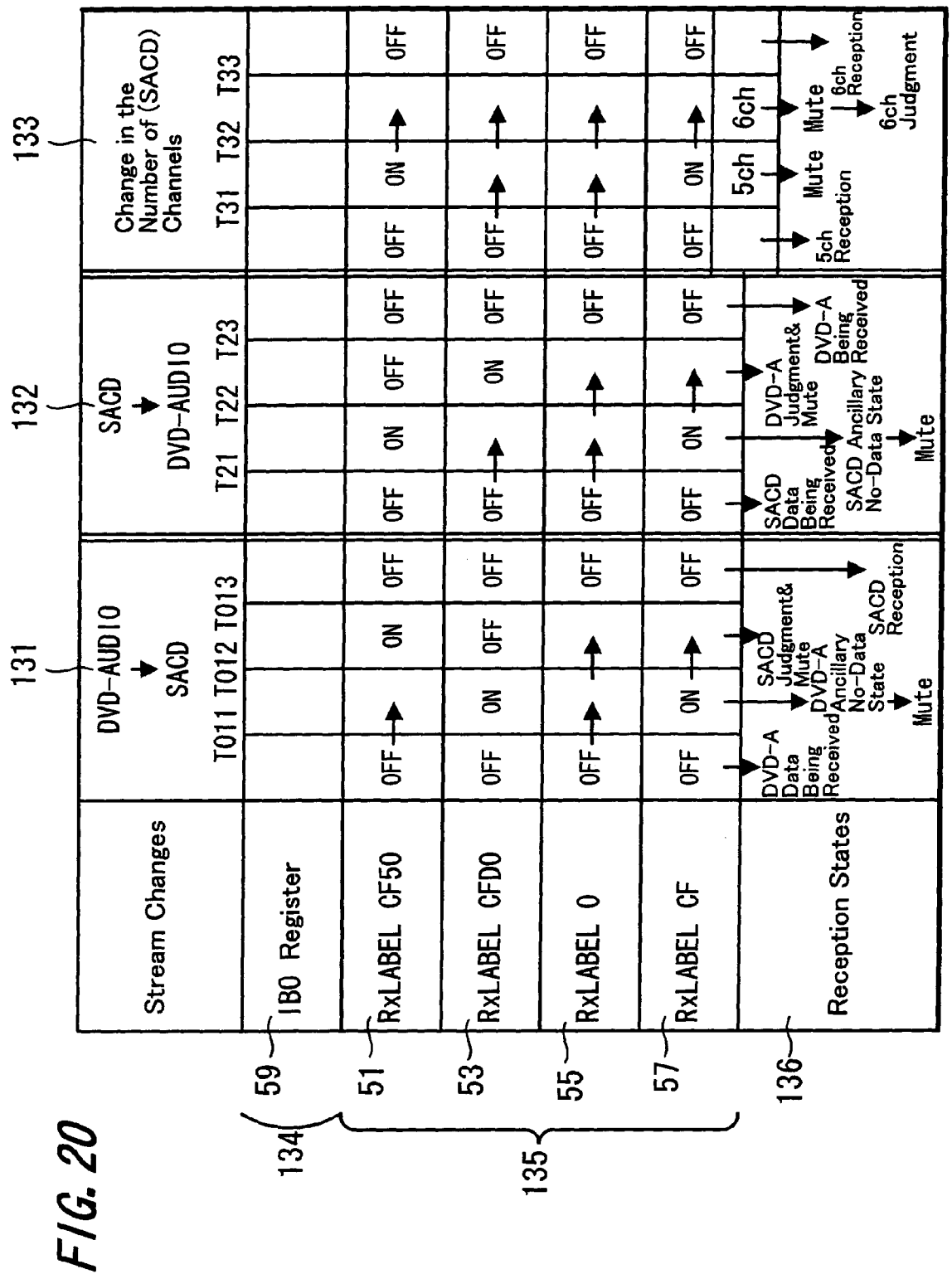

FIG. 20 is a drawing showing a reception state when a receiver receives stream data.

In FIG. 20, the IBO register 59 is a confirmation register 134, and the RxLABEL CF50 (51), RxLABEL CFD0 (53), RxLABEL0 (54), and RxLABEL CF (57) are in the trigger detection register 135.

Below, reception states 136 in each of the stream changes 131 to 133 are explained.

In FIG. 20, a stream change in the packet data indicated by 132 (from the SACD format to the DVD-audio format) is the reception state, in the multiformat-compatible receiver 11 shown in FIG. 1, for the case in which the packet data shown in the above-described FIG. 17 undergoes a stream change from the SACD format to the DVD-audio format.

In a stream change (from the SACD format to the DVD-audio format) in the packet data indicated by 132 in FIG. 20, during the interval prior to time T21, when the trigger detection register 135 detects that RxLABEL CF50 (51)=off, RxLABEL CFD0 (53)=off, RxLABEL0 (54)=off, and RxLABEL CF (57)=off, as indicated by 136, an SACD format reception packet is being received.

During the interval from time T21 to time T22, when the trigger detection register 135 detects that RxLABEL CF50 (51)=on, RxLABEL CFD0 (53)=off, RxLABEL0 (54)=off, and RxLABEL CF (57)=on, as indicated by 136, the received packet is judged to be in the SACD ancillary no-data state, and on the receiving side a mute state is entered in which audio is not output.

During the interval from time T22 to time T23, when the trigger detection register 135 detects that RxLABEL CF50 (51)=off, RxLABEL CFD0 (53)=on, RxLABEL0 (54)=off, and RxLABEL CF (57)=on, as indicated by 136, the received packet is judged to be a packet in DVD-audio format, and the receiving side enters the mute state in which audio is not output.

During the interval following time T23, when the trigger detection register 135 detects that RxLABEL CF50 (51)=off, RxLABEL CFD0 (53)=off, RxLABEL0 (54)=off, and RxLABEL CF (57)=off, a DVD-audio format reception packet is being received.

In FIG. 20, the stream change in the packet data indicated by 133 (change in the number of SACD channels) is the reception state in the multiformat-compatible receiver 11 shown in FIG. 1 for the case of a stream change in the packet data shown in the above-described FIG. 18 from SACD 5-channel format to SACD 6-channel format.

In the stream change (change in the number of SACD channels) in the packet data indicated by 133 in FIG. 20, during the interval prior to time T31, when the trigger detection register 135 detects that RxLABEL CF50 (51)=off, RxLABEL CFD0 (53)=off, RxLABEL0 (54)=off, and RxLABEL CF (57)=off, as indicated by 136, an SACD 5-channel format reception packet is being received.

During the interval from time T31 to time T32, when the trigger detection register 135 detects that RxLABEL CF50 (51)=on, RxLABEL CFD0 (53)=off, RxLABEL0 (54)=off, and RxLABEL CF (57)=on, as indicated by 136, the received packet is judged to be in the SACD ancillary no-data state, and the receiving side enters the mute state in which audio is not output.

During the interval from time T32 to time T33, when the trigger detection register 135 detects that RxLABEL CF50 (51)=on, RxLABEL CFD0 (53)=off, RxLABEL0 (54)=off, and RxLABEL CF (57)=on, as indicated by 136, the received packet is in the SACD ancillary no-data state, but the receiving side is in the mute state in which audio is not output, and the received packet is judged to be in SACD 6-channel format.

During the interval following time T33, when the trigger detection register 135 detects that RxLABEL CF50 (51)=off, RxLABEL CFD0 (53)=off, RxLABEL0 (54)=off, and RxLABEL CF (57)=off, as indicated by 136, an SACD 6-channel format reception packet is being received.

In FIG. 19, a stream change (from IEC 60958 format to DVD-audio format) in the packet data indicated by 123 results in the reception state of the multiformat-compatible receiver 11 shown in FIG. 1 in the case of a stream change in packet data from IEC 60958 format to DVD-audio format.

In a stream change (from IEC 60958 format to DVD-audio format) in packet data indicated by 123 in FIG. 19, during the interval from time T01 to time T02, when the trigger detection register 135 detects that RxLABEL CF50 (51)=off, RxLABEL CFD0 (53)=off, and RxLABEL0 (54)=off, as indicated by 136, the received packet is judged to be an empty packet, and the receiving side enters the mute state in which audio is not output.

During the interval from T02 to T03, when the trigger detection register 135 detects that RxLABEL CF50 (51)=off, RxLABEL CFD0 (53)=on, RxLABEL0 (54)=off, and RxLABEL CF (57)=on, as indicated by 136, prior notice is given that the received packet is in DVD-audio format.

During the interval following time T03, when the trigger detection register 135 detects that RxLABEL CF50 (51)=off, RxLABEL CFD0 (53)=off, RxLABEL0 (54)=off, and RxLABEL CF (57)=off, as indicated by 136, a DVD-audio format reception packet is being received.

Though not shown here, other stream changes (from IEC 60958 format to CD/MD format) result in similar states. The DVD-audio format is called the multibit linear audio (MBLA) format.

In FIG. 20, the stream change (from DVD-audio format to SACD format) in the packet data indicated by 131 results in the reception state in the multiformat-compatible receiver 11 shown in FIG. 1 for the case of a stream change in the packet data from DVD-audio format to SACD format.

In a stream change (from DVD-audio format to SACD format) in the packet data indicated by 131 in FIG. 20, during the interval prior to time T0111, when the trigger detection register 135 detects that RxLABEL CF50 (51)=off, RxLABEL CFD0 (53)=off, RxLABEL0 (54)=off, and RxLABEL CF (57)=off, as indicated by 136, a DVD-audio format reception packet is being received.

During the interval from time T011 to time T012, when the trigger detection register 135 detects that RxLABEL CF50 (51)=off, RxLABEL CFD0 (53)=on, RxLABEL0 (54)=off, and RxLABEL CF (57)=on, as indicated by 136, the received packet is judged to be in the DVD-audio ancillary no-data state, and the receiving side enters the mute state in which audio is not output.

During the interval from time T012 to time T013, when the trigger detection register 135 detects that RxLABEL CF50 (51)=on, RxLABEL CFD0 (53)=off, RxLABEL0 (54)=off, and RxLABEL CF (57)=on, as indicated by 136, the received packet is judged to be in SACD format, and the receiving side enters the mute state in which audio is not output.

During the interval following time T013, when the trigger detection register 135 detects that RxLABEL CF50 (51)=off, RxLABEL CFD0 (53)=off, RxLABEL0 (54)=off, and RxLABEL CF (57)=off, as indicated by 136, an SACD format reception packet is being received.

As stated above, by means of operation of a microcontroller or other judgment means using the registers in the IEEE 1394 link chip 12 within the multiformat-compatible receiver 11 shown in FIG. 1 when receiving AM824 data, stream changes corresponding to data combinations can be detected, and the subsequent data format can be judged.

When RxLABEL CF (57)=on, CF is contained in the audio label of the AM824 data.

Then, when RxLABEL CF50 (51)=on, an SACD format packet is being received. At this time, the audio label and sub-label of the second quadlet of the AM824 data are CF50. Here the second quadlet is examined because, in 1-bit audio and multi-bit audio, the positions of ancillary data are different, so that if the second quadlet is checked it is possible to discriminate the type of data content in the case of 1-bit audio and the data format through the type of ancillary data in the case of multi-bit audio. In this case, ancillary no-data for SACD or other 1-bit audio data is included. That is, a stream change related to SACD or other 1-bit audio is occurring.

Next, when RxLABEL CFD0 (53)=on, a DVD-audio format packet is being received. At this time, the audio label and sub-label of the second quadlet of the AM824 data are CFD0. Here the second quadlet is examined for the same reason as the above-mentioned RxLABEL CF50 (51). In this case, ancillary no-data is included in the DVD-audio or other multi-bit linear audio data. That is, a stream change related to the DVD-audio or other multibit linear audio is occurring.

Next, when RxLABEL0 (54)=on, a CD/MD format packet is being received. At this time, when the leading four bits of the AM824 data are 0, the data being received is IEC 60958-conformant data.

The contents of the IBO register are the audio label and sub-label for two received quadlets. Here received data is normally stored. By confirming this audio label and sub-label, the format of the data currently being received can be confirmed.

Here, if data allocated to each register is detected, the format of the data in the stream change can be judged and confirmed.

Further, in cases other than a stream change in the packet data, that is, when AM824 data is constantly being input, the current AM824E format can be judged from the audio label and sub-label of the IBO register.

As explained above, when IEC 60958-conformant (CD/MD or similar) data is being received, and SACD or other 1-bit audio data is then received, the following procedure is used to judge that the packet data is in SACD format.

First, when IEC 60958-conformant data is being input constantly, PxLABEL0 (54)=on. Next, when a stream change occurs so that the packet data changes to a different format, in order to indicate this change, the receiver receives ancillary no-data or empty packet data. At this time, RxLABEL0 (54)=off, and the beginning of the stream change can be detected. Here, as an example, when SACD 1-bit audio data is received, RxLABEL CF (57)=on results, indicating this SCAD anceillary no-data. At this time, if a state obtains in which only one RxLABEL is on, the data format can be confirmed to be SACD, so that the IEEE 1394 microcontroller 13 within the multiformat-compatible receiver 11 shown in FIG. 1 can set the IEEE 1394 link chip 12 to the reception mode for the SACD format. Finally, when a stream change ends, SACD format data is constantly input, and RxLABEL CF50 (51)=off; further, RxLABEL CF (57)=off, and the end of the stream change can be judged.

Also, when SACD or other 1-bit audio data is being received, and IEC 60958-conformant (CD/MD or similar) data is then received, when judging that the data is IEC 60958-conformant, the following procedure is used.

When a stream change occurs because SACD or other 1-bit audio data had been input constantly and the data format of the packet data is changed, the receiver receives ancillary no-data, RxLABEL CF50 (51) is turned on, and the beginning of a stream change can be detected. Next, if as an example IEC 60958-conformant data arrives, all the RxLABEL flags are turned off, and it can be predicted that a stream change is occurring to IEC 60958-conformant data. Because there exists equipment which, due to past standards, does not use IEC 60958-conformant ancillary no-data, a judgment cannot be made solely on the basis of ancillary no-data. However, in this case it is certain that the packet data is not in a 1-bit audio or multi-bit audio format, and so the IEC 60958-conformant format is predicted, and by examining the audio label and sub-label of actually received data, the format can be determined reliably, so that the IEEE 1394 microcontroller 13 within the multiformat-compatible receiver 11 shown in FIG. 1 can set the IEEE 1394 link chip 12 to the IEC 60958-conformat reception mode. Finally, when IEC 60958-conformant data actually arrives, RxLABEL0 (54) is turned on, and the end of the stream change can be judged. In this case, ancillary no-data is not used, and so the end of the stream change cannot be judged from the state of RxLABEL CF (57); but the stream change end can be judged from the above-described turning on of RxLABEL0 (54).

In cases where SACD or other 1-bit audio data is being received, and then DVD-audio or other multi-bit linear audio data is received, the following procedure is used to judge that the data is DVD-audio.

First, when 1-bit audio data is arriving, and then the format of the packet data changes so that a stream change occurs, RxLABEL CF (57) is turned on. At this time, if only one RxLABEL is turned on, it can be confirmed that the next data format is the multi-bit audio data format, and so the IEEE 1394 microcontroller 13 within the multiformat-compatible receiver 11 shown in FIG. 1 can set the IEEE 1394 link chip 12 into the multi-bit audio reception mode. Finally, when multi-bit audio data arrives, RxLABEL CF50 (51) is turned off, and RxLABEL CF (57) is turned off, so that the stream change end can be judged.

Next, when a stream change is detected when the data format does not change but the number of channels of audio data changes, the following procedure is used. As an example, the case in which there is a change in SACD data, which is 1-bit audio data, from 5 channels to 6 channels is explained.

When there are a plurality of channels, the data size changes depending on the number of channels. This data size is stated as the data length in the 1394 header. It is sufficient to be able to judge differences in this data length.

In this example, 1-bit audio data is received in a continuous state; when a stream change occurs in order to change the number of channels of the packet data, RxLABEL CF50 (51) is turned on. At this time, the beginning of the stream change can be detected. When the stream change is detected, the ancillary no-data data length is confirmed, and the number of channels is judged from the data size. RxLABEL CF50 (51)=on even when the next ancillary no-data arrives, and so detection at the instant of the change is not possible; but according to AM824E standards, the interval for output of ancillary no-data is 10 msec or longer, and so if this check is repeated at fixed intervals, a change in the data length can be detected. By means of this detection, the number of channels of new data can be judged, and the IEEE 1394 microcontroller 13 within the multiformat-compatible receiver 11 shown in FIG. 1 can set the IEEE 1394 link chip 12 to the reception mode for the detected number of channels. Finally, when actual data arrives, all RxLABEL flags are turned off, and RxLABEL CF(57)=off, so that the end of the stream change can be judged.

The Direct Stream Digital (DSD) method adopted by SACD is a method which represents the magnitude of audio signals using the density (concentration) of 1-bit digital pulses, and is completely different from the conventional Pulse Code Modulation (PCM) method.

In the above-described aspect, an example was described which uses an IEEE 1394-standard interface; however, the present invention is not thereby limited, and other interfaces such as a USB (Universal Serial Bus) interface or wireless IEEE 1394-standard interface may be used.

The signal reproduction device of this invention comprises reception means to receive transmitted transmission signals resulting from the conversion of data in a plurality of prescribed signal formats into a prescribed packet type; reproduction means to reproduce signals in a prescribed signal format from transmission signals received by the reception means and converted into packets; packet extraction means to extract a prescribed packet of transmission signals received by the reception means; modification data detection means to detect, in an extracted packet, data indicating that modification has been performed from the currently received prescribed signal format to another prescribed signal format; and, control means to send, to the reproduction means, parameters necessary for reproduction by the reproduction means, from signals received and converted into packets to signals in another prescribed signal format, based on detected signal format modification data. Hence there is the advantageous result that the data format can be automatically judged from the input data, and data can be reproduced.

Further, a signal reproduction device of this invention further comprises output means to output signals reproduced by the reproduction means of the above-described signal reproduction device; when signal type modification data is detected, the control means can suppress the output of signals from the output means during the period until completion of the signal format conversion, so that there is the advantageous result that degradation of the quality of reproduced signals accompanying modification of the signal format can be prevented.

Also, a signal reproduction device of this invention has the further advantageous result that, in the above description, data indicating modification of the signal format is such that, after transmission of a signal indicating that transmitted data in the signal format currently being received is invalid data, data indicating the signal format of the data to be transmitted next is transmitted, so that the next data format can be predicted and reception settings for this data can be set in advance.

Also, a signal reproduction device of this invention has the further advantageous result that, in the above description, the signal reproduction device detects other signal formats through the packet size of received data, so that when the data size changes due to a change in the number of channels, because the data size is described as the data length in the header, by judging differences in the data length it is possible to judge changes in the number of channels.

Also, a signal reproduction method of this invention comprises a reception step, in which transmission signals, obtained by converting data in a plurality of prescribed signal formats into a prescribed packet format and transmitting, are received; a reproduction step, in which signals in a prescribed signal format are reproduced from transmission signals converted into packet form, received in the reception step; a packet extraction step, in which a prescribed packet of transmission signals received in the reception step is extracted; a modification data detection step, in which data is detected, in an extracted packet, indicating that modification has been performed from the currently received prescribed signal format to another prescribed signal format; and, a control step, in which, based on the detected signal format modification data, parameters necessary for reproduction of signals in another prescribed signal format from received signals converted into packets in the reception step are sent to the reproduction step. Hence there is the advantageous result that the data format can be automatically judged from the input data, and reproduction processing can be performed.

INDUSTRIAL APPLICABILITY

This signal reproduction device examines received data packets and automatically recognizes the data format, and through the operation of a microcontroller or other judgment means utilizing the registers of an IEEE 1394 link chip within a multiformat-compatible receiver which has received AM824 data, detects stream changes according to data combinations and can judge the next data format. The signal reproduction device can be applied to, for example, IEC 60958-conformant format data among the formats conforming to the audio and music data transmission protocol 1.0 and AMDTR 2.0, to DSD (Digital Stream Direct) format data, and to DVD (Digital Versatile Disc) audio format data.

| DESCRIPTION OF REFERENCE NUMERALS |  |
| --- | --- |
| 1 | MULTIFORMAT-COMPATIBLE TRANSMITTER |
| 2 | DISC |
| 3 | DSP |
| 4 | IEEE 1394 LINK CHIP |
| 5 | IEEE MICROCONTROLLER |
| 6 | SYSTEM MICROCONTROLLER |
| 7 | OPERATION PORTION |
| 8 | DISPLAY PORTION |
| 11 | MULTIFORMAT-COMPATIBLE RECEIVER |
| 12 | IEEE 1394 LINK CHIP |
| 13 | IEEE MICROCONTROLLER |
| 14 | SYSTEM MICROCONTROLLER |
| 15 | OPERATION PORTION |
| 16 | DISPLAY PORTION |
| 17 | D/A CONVERTER |
| 18 | SPEAKER |
| 19 | CFR READING |
| 20 | RECEIVED FORMAT SETTING |
| 21 | IEEE 1394 PACKET |
| 22 | 1394 HEADER |
| 23 | AM824 FLAG |
| 24 | AM824 DATA |
| 25 | DATA |
| 26 | REGISTER |
| 27 | CF50 FLAG |
| 28 | ANCILLARY NO-DATA |
| 29 | STREAM CHANGE DETECTION |
| 41 | IEC 60958-CONFORMANT |
| 42 | MULTI-BIT LINEAR AUDIO |
| 43 | ONE-BIT AUDIO DATA |
| 44 | ANCILLARY NO-DATA IEC 60958-CONFORMANT FORMAT |
| 45 | ANCILLARY NO-DATA MULTI-BIT LINEAR AUDIO |
| 46 | ANCILLARY NO-DATA ONE-BIT AUDIO DATA |
| 51 | CF50 FLAG |
| 52 | SACD DATA |
| 53 | CFD0 FLAG |
| 54 | DVD AUDIO |
| 55 | RxLABEL0 (ON) |
| 56 | CD/MD DATA (IEC 60958) |
| 57 | RxLABEL0 (ON) |
| 58 | AUDIO LABEL CF |
| 59 | IBO REGISTER |
| 60 | DATA FORMAT CONFIRMATION |
| 61 | AM824E STREAM |
| 62 | IEC 60958 CONTEXT |
| 63 | SACD CONTEXT |
| 64 | IEC 60958 DATA |
| 65 | IEC 60958 ANCILLARY NO-DATA |
| 66 | SACD ANCILLARY NO-DATA |
| 67 | SACD |

The invention claimed is:

1. A signal reproduction device, comprising:
reception means to receive transmission signals transmitted after conversion of data in a plurality of prescribed signal formats into a prescribed packet type;
reproduction means to reproduce signals in a prescribed signal format from said transmission signals received by said reception means and converted into packets;
packet extraction means to extract a prescribed packet from said transmission signals received by said reception means, in order to detect a signal format of data transmitted by said transmission signals received by said reception means;

modification data detection means to detect, from said extracted packet, modification from said prescribed signal format currently being received to another prescribed signal format using a packet size of said extracted packet, and to generate signal format modification data; and, control means to send, to said reproduction means, parameters necessary for reproduction by said reproduction means, from said transmission signals received by said reception means and converted into packets to signals in said other prescribed signal format, based on said detected and generated signal format modification data.

2. The signal reproduction device according to claim 1, wherein said signal reproduction device further comprises output means to output signals reproduced by said reproduction means, and wherein when said control means detects said signal format modification data, output of signals from said output means is suppressed during an interval until completion of said signal format modification.

3. The signal reproduction device according to claim 1, wherein said signal format modification data is such that, after a signal is transmitted indicating that data transmitted in said prescribed signal format currently being received is invalid data, data indicating said other prescribed signal format of subsequently transmitted data is transmitted.

4. The signal reproduction device according to claim 1, wherein data in said prescribed signal format conforms to the IEEE 1394 standard.

5. A signal reproduction method, comprising:
a reception act, in which transmission signals, transmitted after conversion of data in a plurality of prescribed signal formats into a prescribed packet format, are received;
a reproduction act, in which signals in a prescribed signal format are reproduced from said transmission signals converted into said prescribed packet format, received in said reception act;
a packet extraction act, in which a prescribed packet is extracted from said transmission signals received by said reception means, in order to detect a signal format of data transmitted by said transmission signals;
a modification data detection act, in which, from said extracted packet, modification from said prescribed signal format currently being received to another prescribed signal format is detected using a packet size of said extracted packet, and signal format modification data is generated; and,
a control act, in which, based on said detected and generated signal format modification data, parameters necessary for reproduction of signals in said other prescribed signal format from said transmission signals converted into said prescribed packet format in said reproduction act are sent to said reproduction act.

6. The signal reproduction method according to claim 5, further comprising an output act in which signals reproduced in said reproduction act are output, and wherein, when said signal format modification data is detected in said control act, output of signals in said output act is suppressed during an interval until completion of said signal format modification.

7. The signal reproduction method according to claim 5, wherein said signal format modification data is such that, after a signal is transmitted indicating that data transmitted in said prescribed signal format currently being received is invalid data, data indicating said other prescribed signal format of subsequently transmitted data is transmitted.

8. The signal reproduction method according to claim 5, wherein data in said prescribed signal format conforms to the IEEE 1394 standard.

* * * * *